(12) United States Patent
Tomatsu

(10) Patent No.: US 7,413,356 B2
(45) Date of Patent: *Aug. 19, 2008

(54) IMAGE-TAKING APPARATUS

(75) Inventor: Kei Tomatsu, Shiki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/965,132

(22) Filed: Dec. 27, 2007

(65) Prior Publication Data

US 2008/0101788 A1     May 1, 2008

Related U.S. Application Data

(62) Division of application No. 11/148,873, filed on Jun. 8, 2005, now Pat. No. 7,338,220.

(30) Foreign Application Priority Data

| Jun. 11, 2004 | (JP) | ............................. 2004-173600 |
| Jun. 15, 2004 | (JP) | ............................. 2004-177543 |

(51) Int. Cl.
*G03B 19/12*     (2006.01)

(52) U.S. Cl. .................................................. 396/358

(58) Field of Classification Search ................. 396/354, 396/357, 358

See application file for complete search history.

(56) References Cited

U.S. PATENT DOCUMENTS

| 5,349,405 A | * | 9/1994 | Itabashi et al. .............. 396/358 |
| 5,432,574 A | | 7/1995 | Azuma Miyazawa et al. |
| 7,338,220 B2 | * | 3/2008 | Tomatsu ..................... 396/358 |

FOREIGN PATENT DOCUMENTS

| JP | 63-169632 | * | 7/1988 |
| JP | 01-134443 | * | 5/1989 |
| JP | 05-173246 A | | 7/1993 |
| JP | 2002-123221 | * | 1/2002 |
| JP | 2002-174850 | * | 6/2002 |

* cited by examiner

*Primary Examiner*—Christopher Mahoney
(74) *Attorney, Agent, or Firm*—Cowan, Liebowitz & Latman, P.C.

(57) ABSTRACT

An image-taking apparatus is disclosed which has a mirror drive mechanism with a small number of constituent parts, easy assembly. The image-taking apparatus has a mirror movable to a first position in an optical path and to a second position outside the optical path, a first biasing member biasing the mirror from the second position to the first position, a second biasing member biasing the mirror from the first position to the second position, a holding member holding the first biasing member in a charged state, a first cam having a charge portion for charging the second biasing member and a release portion for releasing the charge of the second biasing member, a second cam releasing the holding by the holding member, and a motor driving both of the first and second cams only in one direction.

7 Claims, 18 Drawing Sheets

IMAGE-TAKING APPARATUS

CROSS-REFERENCE TO RELATED APPLICATION

This application is a divisional of application Ser. No. 11/148,873, filed Jun. 8, 2005, now U.S. Pat. No. 7,338,220 the entire disclosure of which is hereby incorporated by reference.

BACKGROUND OF THE INVENTION

The present invention relates to an image-taking apparatus which drives a mirror which can move into and out of an image-taking optical path.

A mirror drive mechanism of a single-lens reflex camera has a motor, a mirror drive cam gear having a cam portion, a mirror drive lever which drives the rotation of a movable mirror by the lift of the cam portion of the mirror drive cam gear, a shutter drive cam gear having a cam portion, and a shutter drive lever which charges and drives a shutter by the lift of the cam portion of the shutter drive cam gear (for example, see Japanese Patent Publication No. 7-27156).

In the drive mechanism, the mirror drive cam gear directly engages with the shutter drive cam gear, and a transmission gear for transmitting the torque of the motor in one direction engages with one of the cam gears.

The mirror drive cam gear, the shutter drive cam gear, and the transmission gear which engages with one of the cam gears are arranged such that they engage with each other in series. Thus, from the viewpoint of the other cam gear, the number of gear stages through which the motor driving force is transmitted is increased by one as compared with the one cam gear, so that the drive efficiency is not favorable.

In addition, since the mirror drive cam gear directly engages with the shutter drive cam gear, the cam gears rotate in opposite directions. This prevents an ideal arrangement of the rotational axes of the mirror drive lever and the shutter drive lever in view of the drive efficiency.

The mirror drive cam gear directly engages with the shutter drive cam gear and they occupy a pear-shaped space when viewed in the directions of the rotational axes of the cam gears. It is thus impossible to place the mirror drive lever and the shutter drive lever in an ideal arrangement in view of their respective drive efficiencies, which is disadvantageous in the drive efficiency and may increase the size of the camera.

To address them, a drive mechanism has been disclosed in which a mirror transmission gear engaging with a mirror drive cam gear and a shutter transmission gear engaging with a shutter drive cam gear are disposed coaxially and a transmission gear shaft driven by a motor is provided (for example, Japanese Patent Laid-Open No. 2002-23221). According to the abovementioned structure, since the driving force of the motor is directly transmitted to the mirror drive cam gear and the shutter drive cam gear from the associated transmission gears, the difference in drive efficiency caused by the number of gear stages can be reduced as compared with the structure in which the transmission gear engages only with the one of cam gears which engages with the other cam gear. In addition, the mirror drive cam gear and the shutter drive cam gear can be rotated in the same direction to achieve an ideal arrangement of the rotation axes of a mirror drive lever and a shutter drive lever in view of the drive efficiency.

In the abovementioned mechanism, however, the number of parts is increased, and a phase shift may occur in the mirror drive cam gear and the shutter drive cam gear in assembly operation. Also, since the mirror drive cam gear and the shutter drive cam gear are coupled through the transmission gears, the backlash of the gears causes a phase shift, and the rotation of one of the cam gears is feedback controlled, the interlocking drive of a mirror and a shutter cannot be performed with high accuracy.

In the abovementioned two drive mechanisms, when the mirror is moved from within an image-taking optical path to the outside thereof, or when the mirror is moved into the image-taking optical path from the outside thereof, the mirror is driven by the lift of the cam, so that the mirror drive time is extended due to a change in voltage or the like.

Japanese Patent Laid-Open No. 1-134443 has disclosed a mirror drive mechanism which drives a mirror at high speed. The mirror drive mechanism is formed of a first engaging portion which positions the mirror in an image-taking optical path, a first spring which urges the mirror in a direction in which the mirror is moved out of the image-taking optical path, a second engaging portion which positions the mirror outside the image-taking optical path, and a second spring which urges the mirror in a direction in which the mirror is moved into the image-taking optical path, an electromagnet which releases the engagement in the first and second engaging portions, and a motor which charges the first and second springs.

While the mirror drive mechanism allows the high-speed drive of the mirror, it needs a plurality of driving sources and a number of the constituent parts, requiring extremely high cost. In addition, the electromagnet has a finite releasing action on the engagement in the engagement portions and the positioning of the engagement portions cannot be enhanced.

Another image-taking apparatus has been disclosed which has a mirror drive mechanism which utilizes the biasing force of a charged drive spring to allow a mirror to move into and out of an image-taking optical path and requires only one motor as a drive source (Japanese Patent Laid-Open No. 2002-174850).

In the abovementioned mechanism, the engagement of a raising lever needs to be released when the mirror is driven into the image-taking optical path from the outside thereof. Driving the motor for the engagement release simultaneously causes the charging of the spring for biasing the mirror toward the outside of the image-taking optical path, thereby increasing the load on the motor to take a long time for the engagement release.

The motor is rotated in different directions when the mirror is moved out of the image-taking optical path and when the mirror is moved into the image-taking optical path. Since a mechanical lock is used to forcedly stop a cam gear in order to stop the rotation of the motor, a higher mechanical load is applied.

Another mirror drive mechanism drives a charge lever by a cam gear after the completion of mirror drive operation to position an engaging portion of a hold lever provided for the charge lever to a claw portion of a mirror lever. In the mechanism, however, the charge lever is driven at high speed when the engaging portion of the hold lever is positioned to the claw portion of the mirror lever, so that the end of the hold lever at high speed collides with the claw portion of the mirror lever. This may reduce the durability of the end of the hold lever and the claw portion of the mirror lever.

As a means for solving this, Japanese Patent Laid-Open No. 1-134443 mentioned above has disclosed the structure in which the end of the hold lever is always in contact with the claw portion of the mirror lever to avoid a collision between the end of the hold lever and the claw portion of the mirror lever.

In the mechanism, however, the end of the hold lever is always in slide contact with the claw portion of the mirror lever, so that the end of the hold lever needs to extend longer than the charge stroke of the charge lever to cause an increased size of the camera.

BRIEF SUMMARY OF THE INVENTION

An object of the present invention is to provide an image-taking apparatus, which has a mirror drive mechanism with a small number of constituent parts, easy assembly, and low cost.

According to an aspect, the present invention provides an image-taking apparatus comprising a mirror drive apparatus having a mirror, which is movable to a first position at which the mirror is disposed in an optical path and to a second position at which the mirror is retracted outside the optical path, a first biasing member, which produces biasing force for driving the mirror from the second position to the first position, a second biasing member, which produces biasing force for driving the mirror from the first position to the second position, a holding member, which is allowed to hold the first biasing member in a charged state, a first cam, which has a charge portion for charging the second biasing member and a release portion for releasing the charge of the second biasing member, a second cam, which releases the holding by the holding member, and a motor, which drives both of the first and second cams. The motor drives the first and second cams only in one direction.

According to another aspect, the present invention provides an image-taking apparatus comprising a mirror, which is movable with respect to an optical path, a mirror drive member, which is movable to a first position at which the mirror is disposed in the optical path and to a second position at which the mirror is retracted outside the optical path, a first biasing member, which produces biasing force for driving the mirror drive member from the second position to the first position, a shutter, a shutter drive member, which drives the shutter, a coupling member, which is provided on the shutter drive member and couples the mirror drive member to the shutter drive member, a second biasing member, which produces biasing force for driving the shutter drive member and drives the mirror drive member from the first position to the second position via the shutter drive member and the coupling member, a first cam, which has a charge portion for driving the shutter drive member in a direction in which the second biasing member is charged and a release portion for allowing the drive of the shutter drive member by the second biasing member, a second cam, which releases the coupling of the mirror drive member by the coupling member at the second position, and a motor which drives both of the first and second cams. The motor drives the first and second cams only in one direction.

According to yet another aspect, the present invention provides an image-taking apparatus comprising a mirror, which is movable to a first position at which the mirror is disposed in an optical path and to a second position at which the mirror is retracted outside the optical path, a first biasing member, which produces biasing force for driving the mirror from the second position to the first position, a second biasing member, which produces biasing force for driving the mirror from the first position to the second position, an engaging member, which engages with the mirror to prevent the drive of the mirror by the first biasing member, a first cam, which includes a charge portion for charging the second biasing member and a release portion for releasing the charge of the second biasing member, and a second cam, which releases the engagement of the engaging member with the mirror. The second cam causes the engaging member to retract from the mirror when the mirror and the engaging member are relatively moved toward a position at which their engagement is allowed.

According to a further aspect, the present invention provides an image-taking apparatus comprising a mirror, which is movable to a first position at which the mirror is disposed in an optical path and to a second position at which the mirror is retracted outside the optical path, a first biasing member, which produces biasing force for driving the mirror from the second position to the first position, a shutter, a shutter drive member, which drives the shutter, an engaging member, which is provided on the shutter drive member and engages with the mirror, a second biasing member, which produces biasing force for driving the shutter drive member and drives the mirror from the first position to the second position via the shutter drive member and the engaging member, a first cam, which includes a charge portion for driving the shutter drive member in a direction in which the second biasing member is charged and a release portion for allowing the drive of the shutter drive member by the second biasing member, and a second cam, which releases the engagement of the engaging member with the mirror that has been moved to the second position. The second cam causes the engaging member to retract from the mirror when the shutter drive member is driven by the charge portion to a position at which the engagement of the engaging member and the mirror that has been moved to the first position is allowed.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 18:
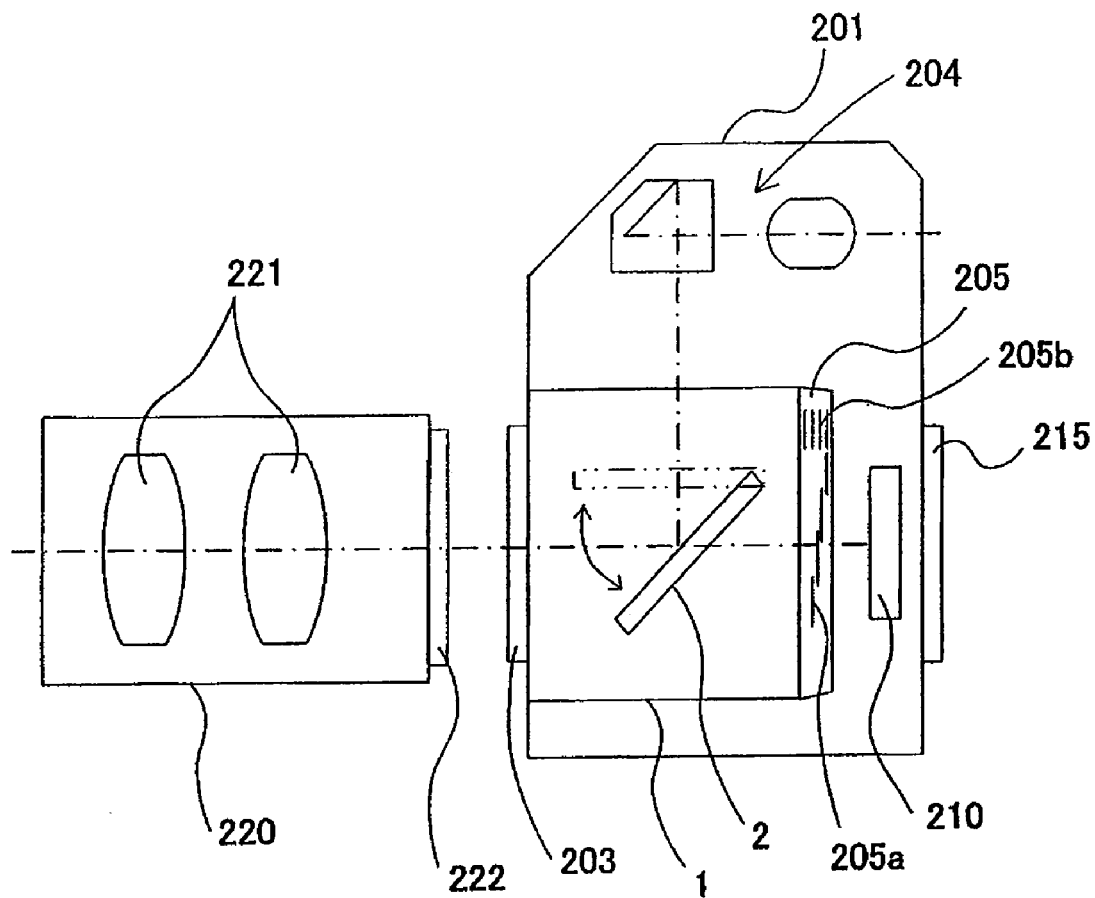
FIG. 18 is a schematic diagram showing the camera of Embodiments 1 and 2.

FIG. 18 schematically shows the structure of a single-lens reflex digital camera (image-taking apparatus) which is Embodiment 1 (and Embodiment 2 described later) of the present invention. In FIG. 18, reference numeral 201 shows a camera body and reference numeral 220 shows an interchangeable lens which is mounted on the camera body 201. The interchangeable lens 220 has an image-taking optical system consisting of a plurality of lenses 221 and a stop, not shown, held therein. A mount 222 is fixed to the rear end of the interchangeable lens 220.

The camera body 201 has a mirror box 1 fixed therein. A mount 203 is fixed to the front of the mirror box 1 on which the mount 222 of the interchangeable lens 220 is mounted through a bayonet mechanism, not shown. A movable mirror 2 is pivotally put in the mirror box 1. The movable mirror 2 can be pivoted between a position at which it is placed in an optical path (image-taking optical path) of light from a subject incident from the interchangeable lens 220 and to a position at which it is placed upward out of the optical path. When the movable mirror 2 is placed in the image-taking optical path, it directs luminous flux from the interchangeable lens 220 to a viewfinder optical system 204 provided in an upper portion of the camera body 201 to allow an operator to observe a subject. When the movable mirror 2 is moved to the position at which it is placed upward out of the optical path, it directs luminous flux from the interchangeable lens 220 toward an image-pickup device 210, later described.

A focal plane shutter unit 205 is fixed to the rear end of the mirror box 1. The focal plane shutter unit 205 has a front curtain 205a and a rear curtain 205b. When images are taken, the front curtain 205a which has been closed travels in an open direction, and after a predetermined time period, the rear curtain 205b which has been opened travels in a close direction to shift a slit opening in parallel with a light-receiving surface of the image-pickup device 210 held in the camera body 201, thereby performing exposure of the image-pickup device 210.

The image-pickup device 210 is formed of a photoelectric conversion device such as a CCD sensor and a CMOS sensor. An image taken by the image-pickup device 210 is recorded on a recording medium such as a semiconductor memory, not shown.

A display 215 for displaying images or the like taken by the image-pickup device 210 is attached to the back of the camera body 210.

Description will hereinafter be made of the structure and operation of a mirror drive mechanism which drives the movable mirror 2 and the shutter unit 205.

Figure 1:
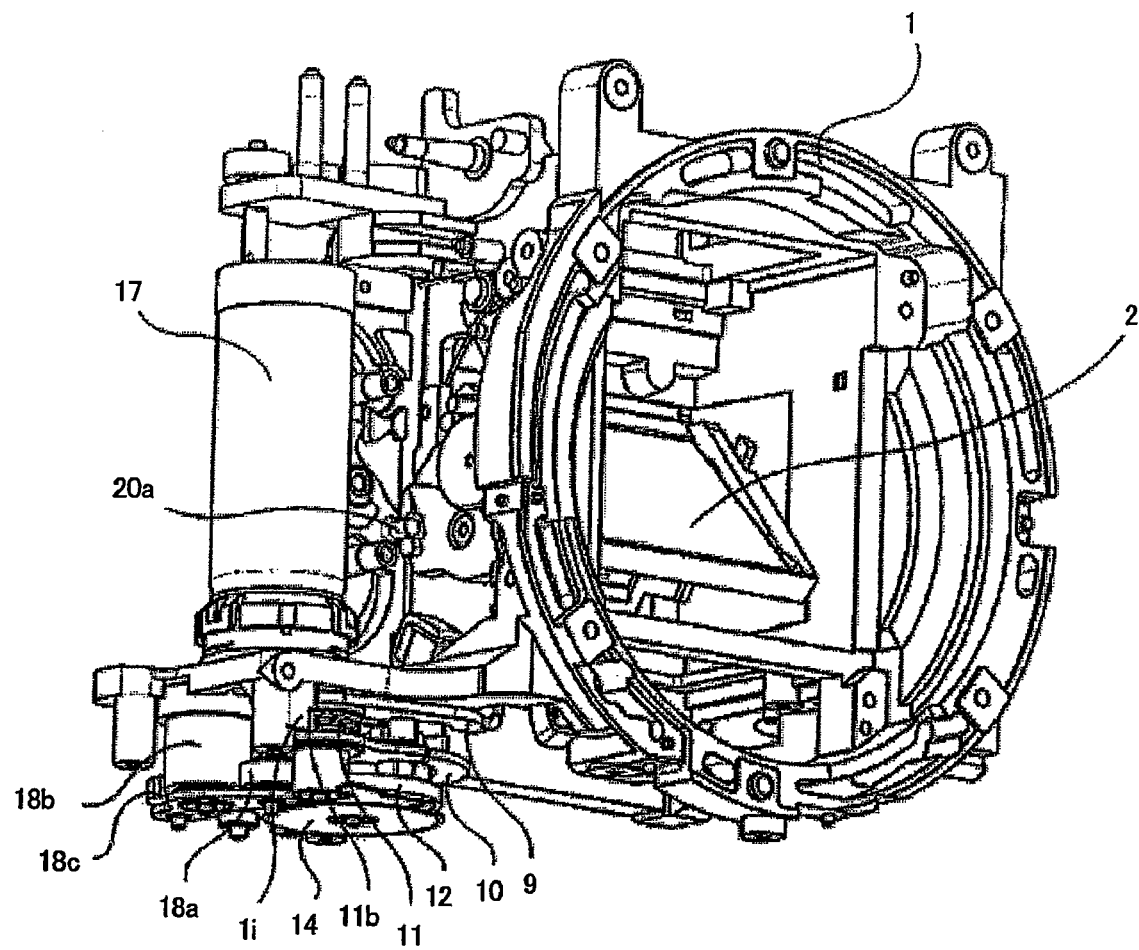
FIG. 1 is a perspective view showing a mirror box and the periphery in a camera which is Embodiment 1 of the present invention.
Figure 2:
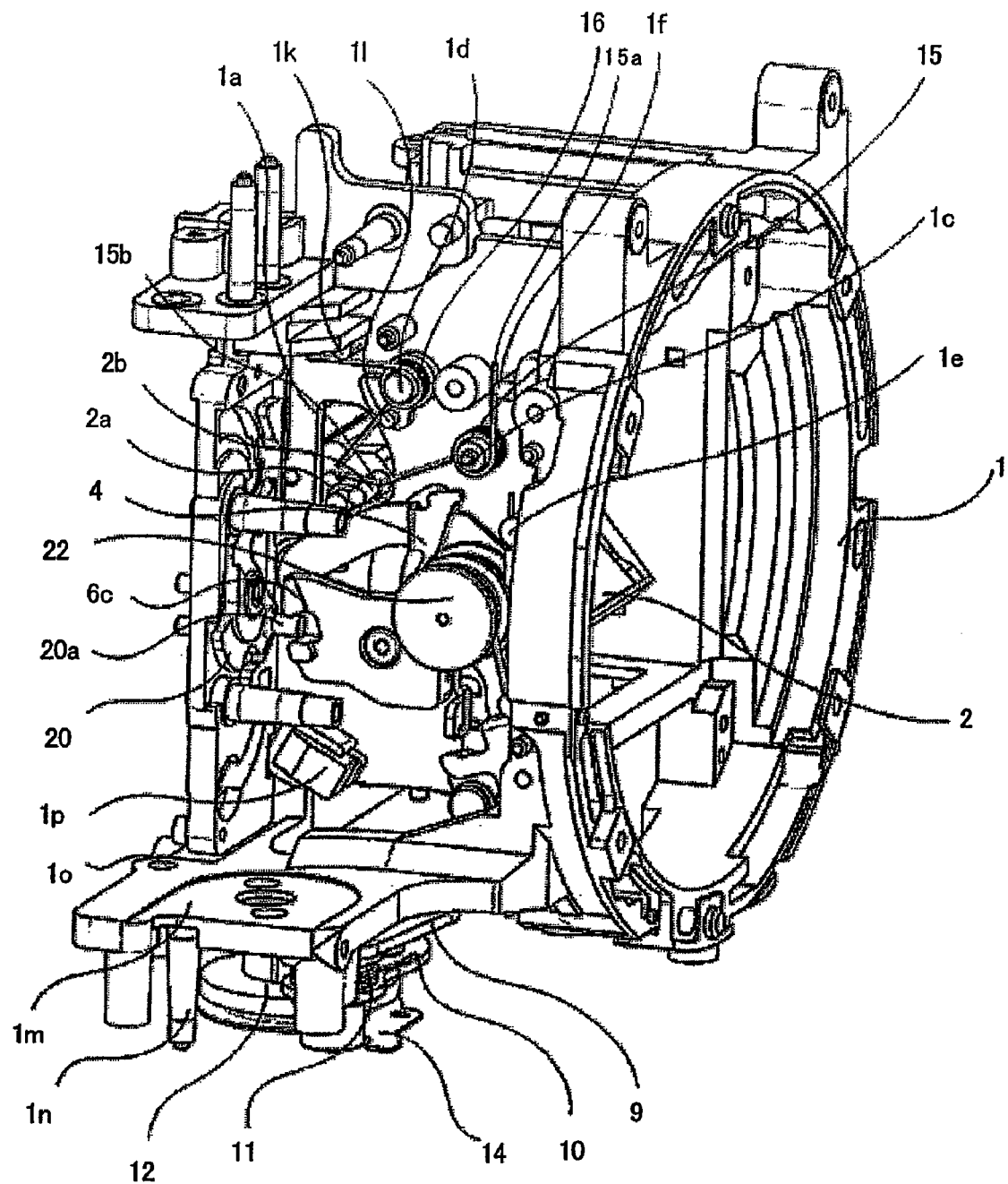
FIG. 2 is a perspective view showing the mirror box and the periphery in the camera which is Embodiment 1.
Figure 3:
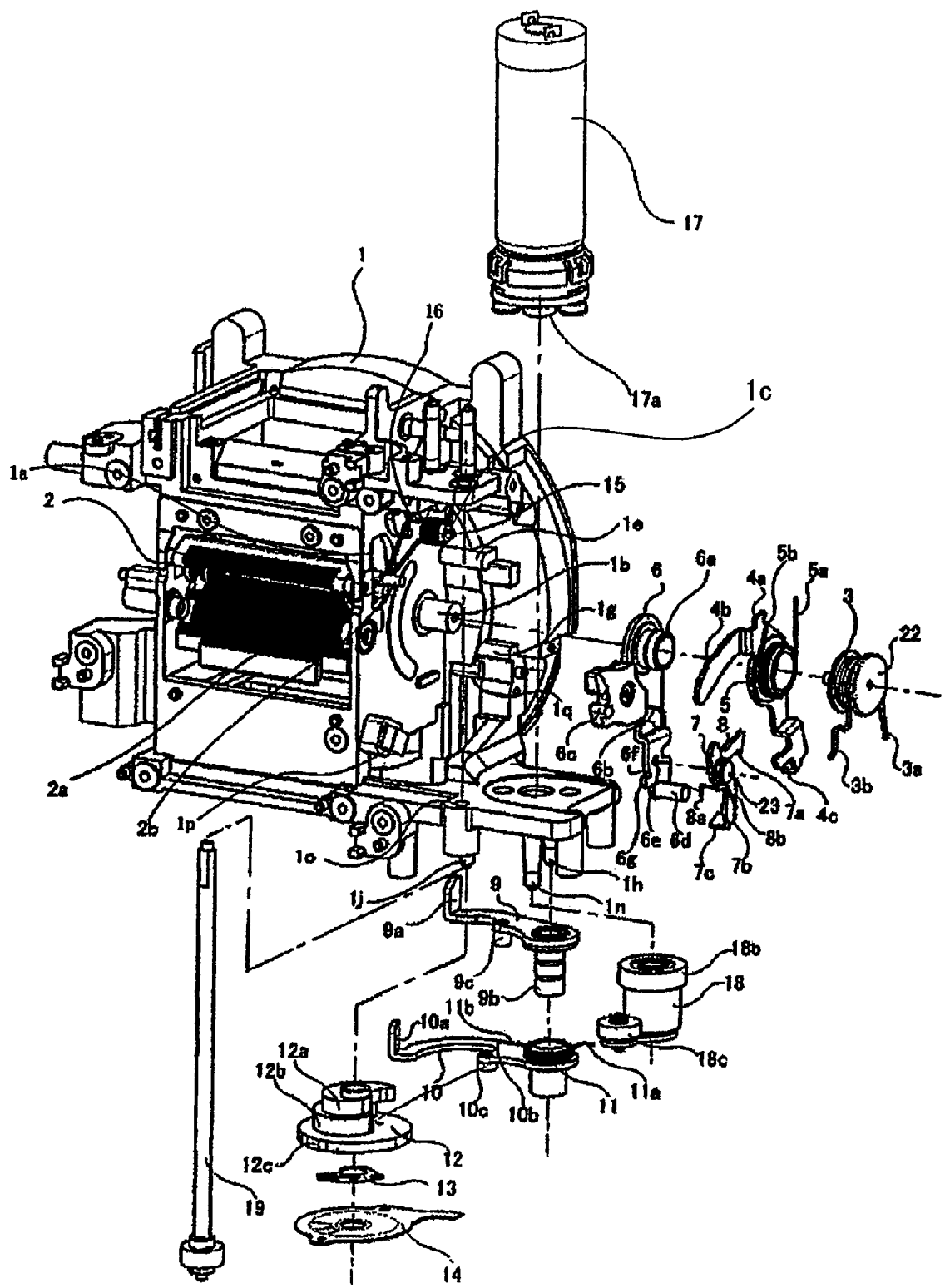
FIG. 3 is an exploded perspective view showing the mirror box and the periphery.

FIGS. 1 and 2 are perspective views showing the structure of the mirror box and the periphery in the camera of Embodiment 1. FIG. 3 is an exploded perspective view showing the structure of the mirror box and the periphery.

In FIGS. 1 to 3, reference numeral 1 shows the mirror box, 2 the movable mirror, 3 a movable mirror drive spring (second biasing member), 4 a mirror drive lever (mirror drive member), 5 a mirror drive lever return spring, 6 a charge lever (driven member, shutter drive member), 7 a hold lever (engaging member), 8 a hold lever return spring, 9 a charge arm, 10 a hold release arm, 11a hold release arm return spring, 12 a cam gear, 13 a phase detection contact, 14 a phase detection substrate, 15 a first movable mirror return spring (first biasing member), 16 a second movable mirror return spring, 17 a motor, 18 a decelerating planet mechanism, 19 a flash unit drive gear, 20 a shutter set member, 22 a movable mirror drive spring fixing member, and 23 a hold lever shaft.

Description will be made of how to arrange and assemble the abovementioned parts.

The movable mirror 2 is held inside the mirror box 1 such that it can be pivoted upward and downward. Reference numeral 2a shows a mirror drive pin which is formed integrally with the movable mirror 2 and protrudes out of the side of the mirror box 1 from the inside thereof. Reference numeral 2b shows a mirror return pin which is formed integrally with the movable mirror 2 and protrudes out of the side of the mirror box 1 from the inside thereof.

Reference numeral 1a shows an opening which is formed in the side of the mirror box 1 and has an opening area larger than the operating area of the mirror drive pin 2a and the mirror return pin 2b when viewed in the axial direction of a shaft portion 1b. Reference numeral 1b shows the shaft portion which rotatably holds the charge lever 6. Reference numerals 1c and 1d show attaching portions which attach the first movable mirror return spring 15 and the second movable mirror return spring 16, respectively.

Reference numeral 1p shows a mirror up positioning portion which abuts on the mirror drive lever 4 for positioning when the mirror is moved up. Reference numeral 1q shows a mirror down positioning portion which abuts on the mirror drive lever 4 for positioning when the mirror is moved down. The shaft portion 1b, the attaching portions 1c, 1d, and the positioning portions 1p, 1q protrude from the side of the outside of the mirror box and are formed integrally with the mirror box.

Reference numeral 6a shows a shaft portion which is provided for the charge lever 6 and rotatably holds the mirror drive lever 4 and around which a coil portion of the mirror drive lever return spring 5 is wound. Reference numeral 5a shows a fixed end of the mirror drive lever return spring 5 which is supported on a pole 1e provided for the mirror box 1. Reference numeral 5b shows a movable end of the mirror drive lever return spring 5 which is supported on a spring receiving portion 4a provided for the mirror drive lever 4. Thus, the mirror drive lever 4 receives elastic force from the mirror drive lever return spring 5 and is urged in a counterclockwise direction.

A coil portion of the first movable mirror return spring 15 is wound around the attaching portion 1c of the mirror box 1. Reference numerals 15a and 15b show a fixed end and a movable end of the first movable mirror return spring 15 which are supported on a pole 1f provided for the mirror box 1 and the mirror return pin 2b provided for the movable mirror 2, respectively. Thus, the movable mirror 2 receives elastic force from the first movable mirror return spring 15 and is driven to a viewfinder observing position.

After the attachment of the mirror drive lever 4 and the charge lever 6 to the mirror box is finished, the fixing member 22 is attached to the end surface of the shaft portion 1b. The movable mirror drive spring 3 is wound around the fixing member 22.

Reference numeral 3a shows a fixed end of the movable mirror driving spring 3 which is supported on a pole 1g provided for the mirror box 1. Reference numeral 3b shows a movable end of the movable mirror drive spring 3 which is supported on a spring receiving portion 6b provided for the charge lever 6. Thus, the charge lever 6 receives elastic force from the movable mirror drive spring 3 and is urged in a clockwise direction (upward).

The movable mirror 2 can be moved into and out of the image-taking optical path from the interchangeable lens mounted on the mount (203 in FIG. 18) attached to the front of the mirror box 1 to the image-pickup device disposed at the rear of the mirror box 1.

Specifically, the movable mirror 2 can be moved between the viewfinder observing position at which it is placed across the image-taking optical path to reflect light from a subject to the viewfinder optical system (204 in FIG. 18) disposed in the upper portion of the mirror box 1 and an image-taking position at which it is placed out of the image-taking optical path to direct light from a subject to the image-pickup device (210 in FIG. 18).

A drive pin abutting portion 4b provided for the mirror drive lever 4 abuts on the mirror drive pin 2a provided for the movable mirror 2. Reference numeral 4c shows a mirror drive lever engaging portion which engages with a first hold lever engaging portion 7a of the hold lever 7. Reference numeral 4d shows an abutting portion which abuts on an abutting portion 1q provided for the mirror box 1.

A concave shutter charge portion 6c provided for the charge lever 6 pinches and holds a drive pin 20a formed integrally with the shutter set member 20, later described. Reference numeral 6d shows a charge lever engaging portion which engages with a charge arm engaging portion 9a of the charge arm 9, later described.

The hold lever 7 has the hold lever return spring 8 wound thereon and is rotatably supported by a hold lever attaching portion 6e provided for the charge lever 6 through the hold lever shaft 23. Reference numeral 8a shows a fixed end of the hold lever return spring which is supported on a spring receiving portion 6f provided for the charge lever 6. Reference numeral 8b shows a movable end of the hold lever return spring which is supported on a spring receiving portion 7b provided for the hold lever 7. Thus, the hold lever 7 receives elastic force from the hold lever return spring 8 and is urged in a clockwise direction. Reference numeral 7c shows a second hold lever engaging portion which engages with a hold release arm engaging portion 10a provided for the hold release arm 10, later described.

The charge arm 9 is rotatably supported by a shaft portion 1h provided for the mirror box 1. Reference numeral 9b shows a shaft portion which rotatably holds the hold release arm 10, later described. A coil portion of the hold release arm return spring 11 is wound on the shaft portion 9b. Reference numeral 11a shows a fixed end of the hold release arm return spring 11 which is supported on a pile 1i provided for the mirror box 1. Reference numeral 11b shows a movable end of the hold release arm return spring 11 which is supported on a spring receiving portion 10b provided for the hold release arm 10. Thus, the hold release arm 10 receives elastic force from the hold release arm return spring 11 and is urged in a counterclockwise direction when viewed from above the mirror box 1.

Reference numeral 9c shows a cam pin provided for the charge arm 9 which abuts on a charge cam 12a (first cam) provided for the cam gear 12. Reference numeral 10c shows a cam pin provided for the hold release arm which abuts on a hold release cam 12b (second cam) provided for the cam gear 12.

The cam gear 12 is rotatably held by a shaft portion 1j provided for the mirror box 1. Thus, the charge cam 12a and the hold release cam 12b are rotated around the shaft portion 1j. A gear portion 12c provided for the cam gear 12 engages with a power transmission gear 18a of the decelerating planet mechanism 18, later described, and rotates in a counterclockwise direction when viewed from above the mirror box 1.

When the cam gear 12 starts rotation operation, the cam pin 9c moves along the outer shape of the charge cam 12a provided for the cam gear 12, and the charge arm 9 accordingly starts rotational reciprocation around the shaft portion 1h.

Since the cam pin 10c similarly moves along the outer shape of the hold release cam 12b provided for the cam gear 12, the hold release arm 10 accordingly starts rotational reciprocation around the shaft portion 9b.

The phase detection contact 13 is fixed to the cam gear 12 with a predetermined phase relationship, and the contact 13 is in contact with the pattern of the phase detection substrate 14, later described.

The phase detection substrate 14 is fixed with a predetermined phase relationship to a gear hold cover, not shown, for holding the parts such as the gears and arms attached to the mirror box 1 to prevent them from coming off the mirror box 1.

The decelerating planet mechanism 18 is rotatably attached to a shaft portion in provided for the mirror box 1, decelerates and transmits the driving force of the motor 17, and switches the transmission of the driving force between the cam gear 12 and the flash unit drive gear 19, later described, in accordance with the rotation direction of the motor 17. Reference numeral 18c shows a power transmission gear which transmits the driving source to the flash unit drive gear 19 when the motor 17 is driven in the opposite direction to that in driving the mirror.

The flash unit drive gear 19 is rotatably inserted into a hole portion 1o provided for the mirror box 1. The flash unit drive gear 19 transmits power for open/close drive of a flash unit, not shown, or zoom drive. It can also transmit driving force to a mechanism other than the flash unit.

The shutter set member 20 is rotatably attached to a flange portion at the rear end of the mirror box 1, and is rotated downward to move the front curtain unit and the rear curtain unit of the focal plane shutter, not shown, in a charge direction. It is rotated upward from the charge complete state to a charge release state in which the charge of the front curtain unit and the rear curtain unit can be released, so that the front curtain and the rear curtain travel from the state in which they are held in the charged state by an electromagnet, not shown, to charge release of front and rear curtain drive springs by a control unit, not shown, controlling the output from the electromagnet to provide a predetermined shutter speed.

Figure 4:
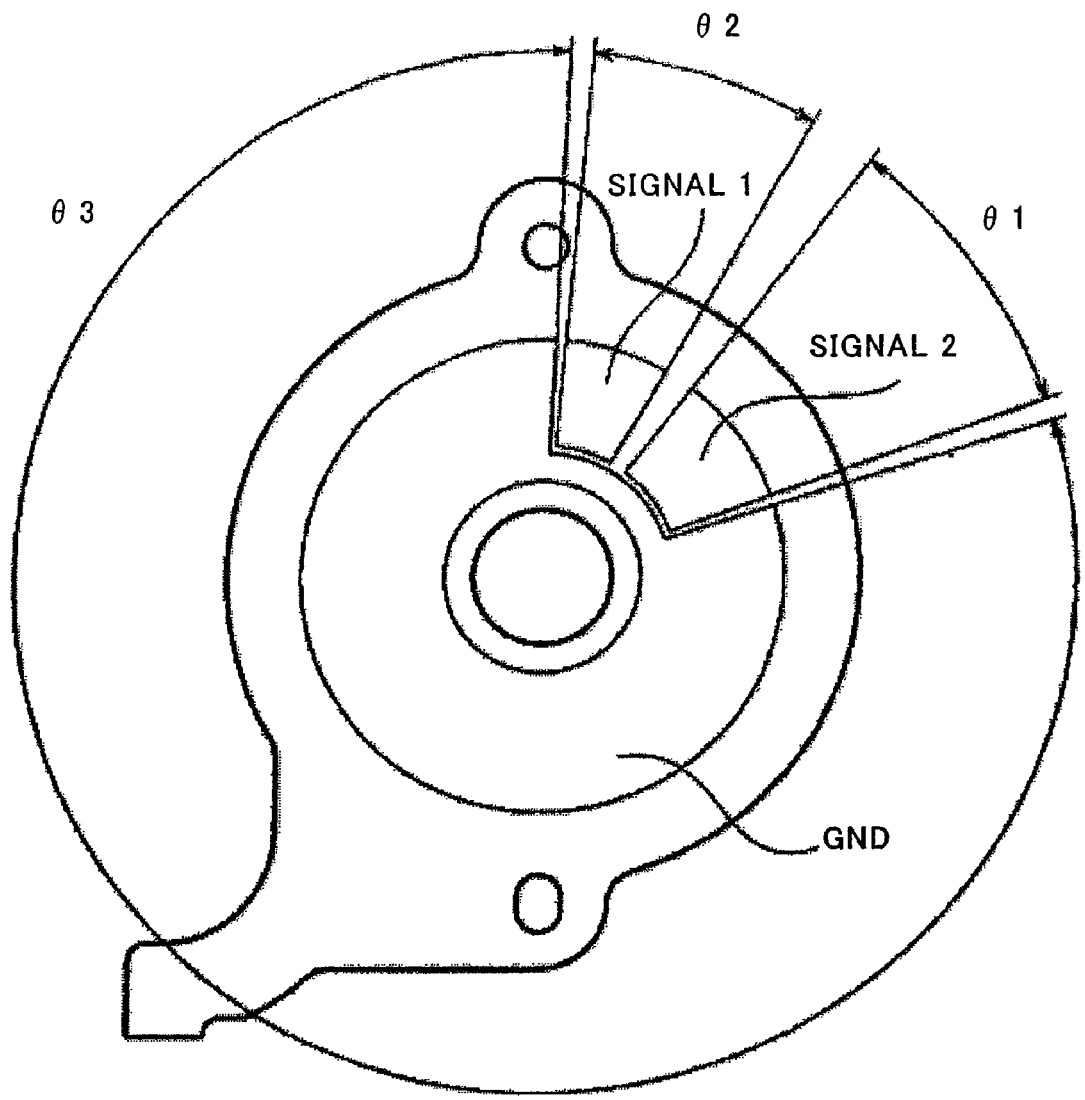
FIG. 4 shows a pattern on a phase detection substrate for detecting the rotational phase of a cam gear in Embodiment 1.
Figure 5:
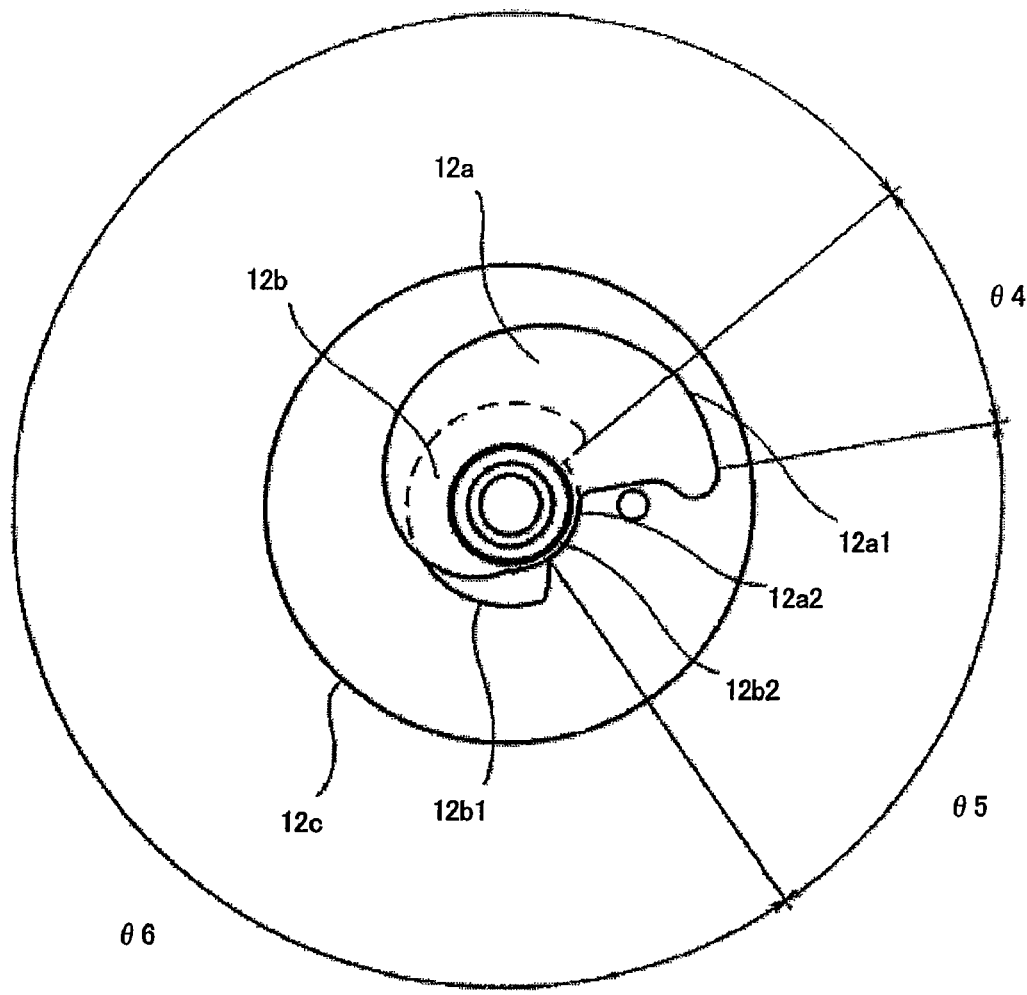
FIG. 5 shows a mirror drive cam and a hold release cam of the cam gear in Embodiment 1.
Figure 6:
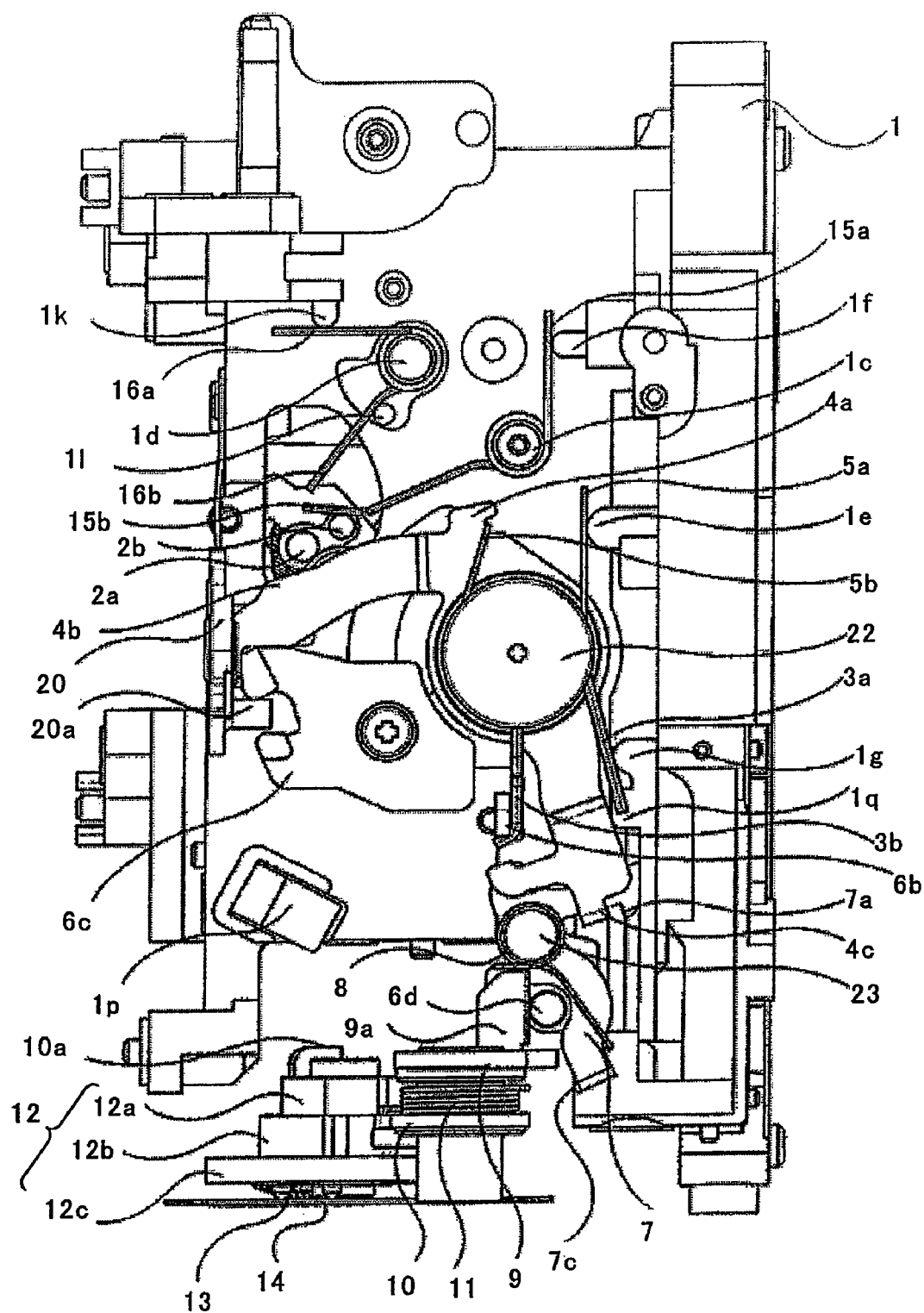
FIG. 6 is a side view showing a mirror drive mechanism when a movable mirror is at a viewfinder observing position and a shutter set member is at a charge complete position in Embodiment 1.
Figure 7:
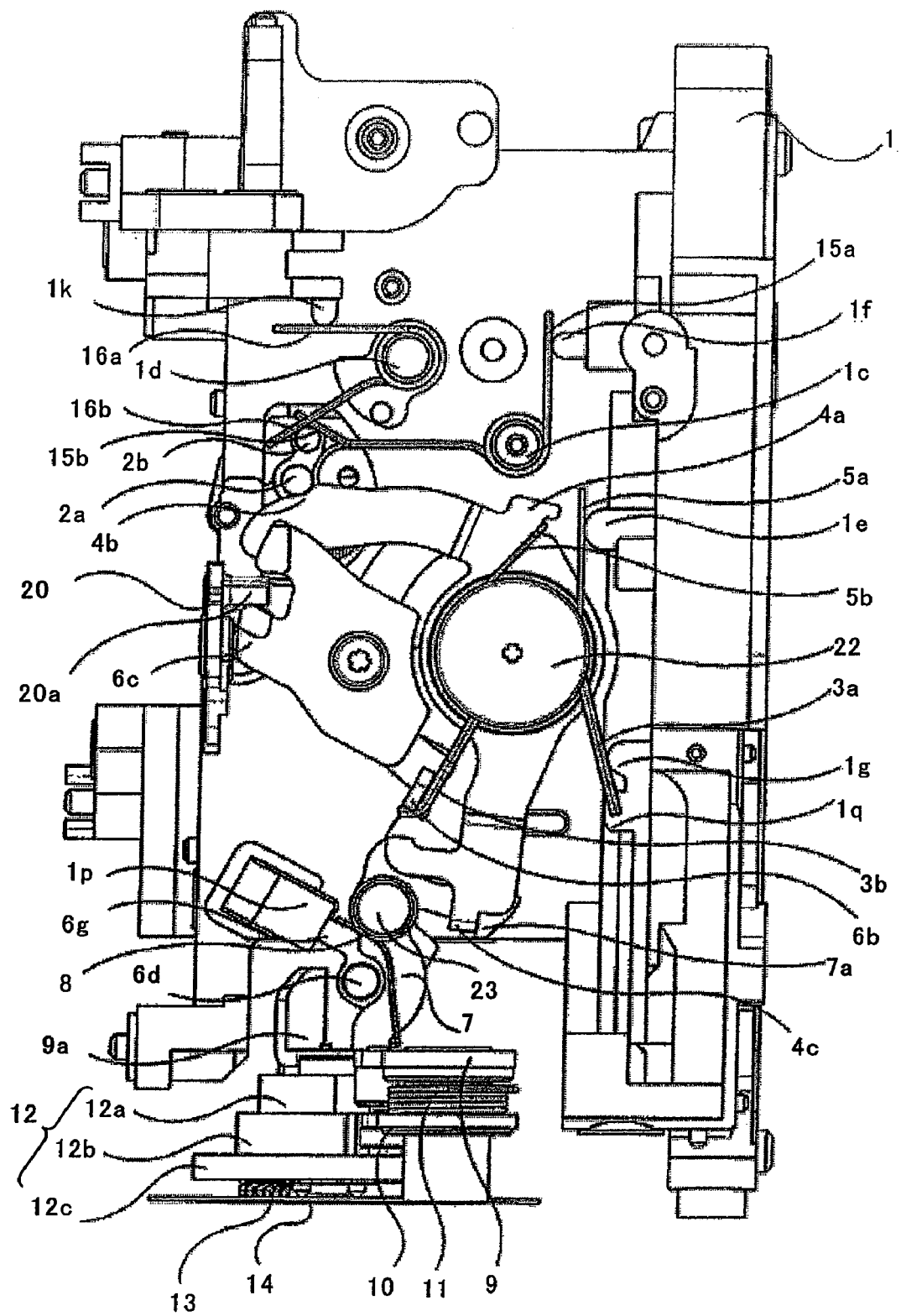
FIG. 7 is a side view showing the mirror drive mechanism when the movable mirror is at an image-taking position and the shutter set member is at a charge release position in Embodiment 1.
Figure 8:
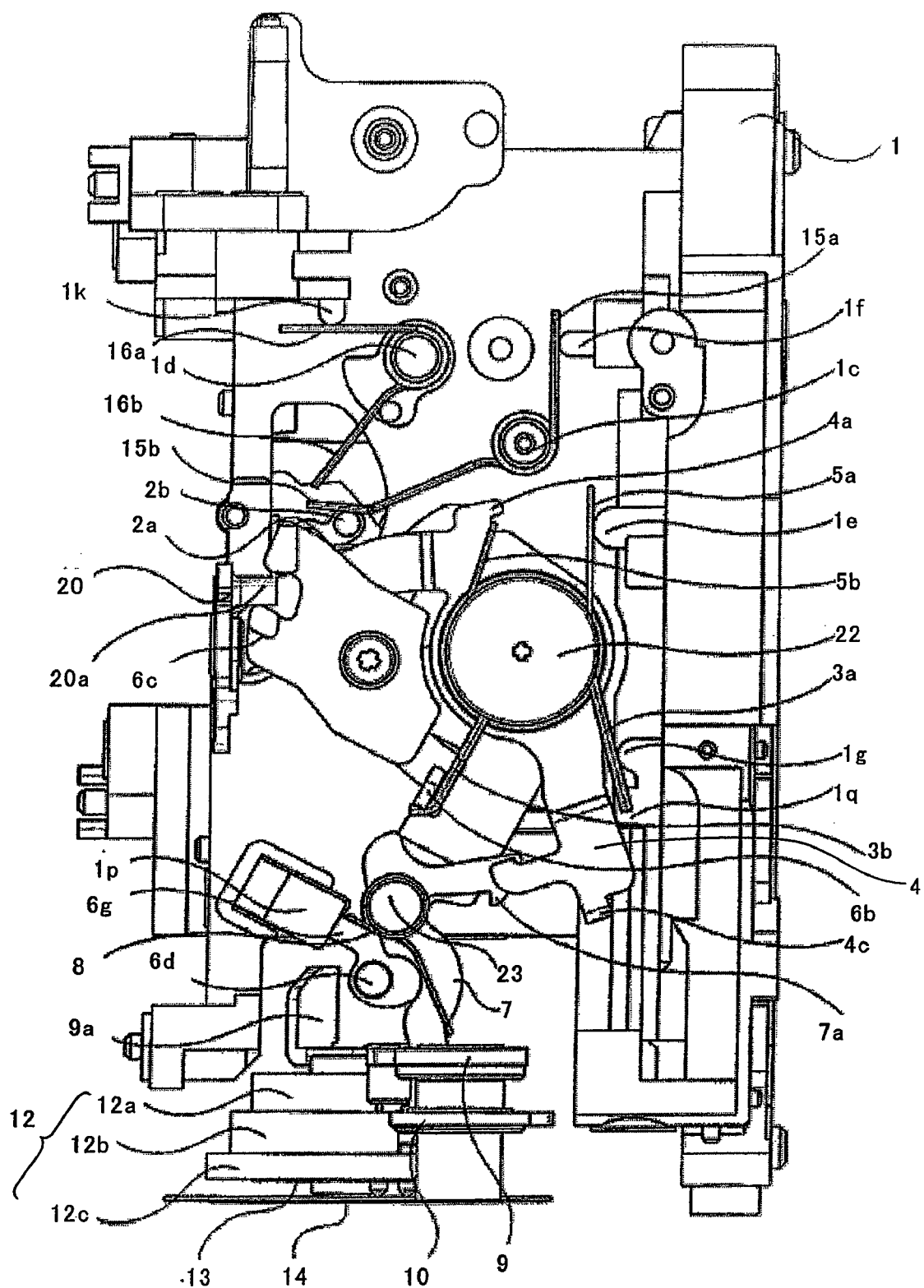
FIG. 8 is a side view showing the mirror drive mechanism when the movable mirror is at the viewfinder observing position and the shutter set member is at the charge release position in Embodiment 1.

Next, description will be made of how to operate and control the mirror drive mechanism with reference to FIGS. 4 to 11. FIG. 4 shows the pattern of the phase detection substrate 14 which detects the rotational position of the cam gear 12. FIG. 5 shows the phase relationship between the charge cam 12a and the hold release cam 12b of the cam gear 12. FIG. 6 shows the mirror drive mechanism when the movable mirror 2 is at the viewfinder observing position and the shutter set member 20 is at the charge complete position, that is, an image-taking standby state. FIG. 7 shows the mirror drive mechanism when the movable mirror 2 is at the image-taking position and the shutter set member 20 is at the charge release position, that is, a mirror up state. FIG. 8 shows the mirror drive mechanism when the movable mirror 2 is at the viewfinder observing position and the shutter set member 20 is at the charge release position, that is, a mirror down state.

Figure 9:
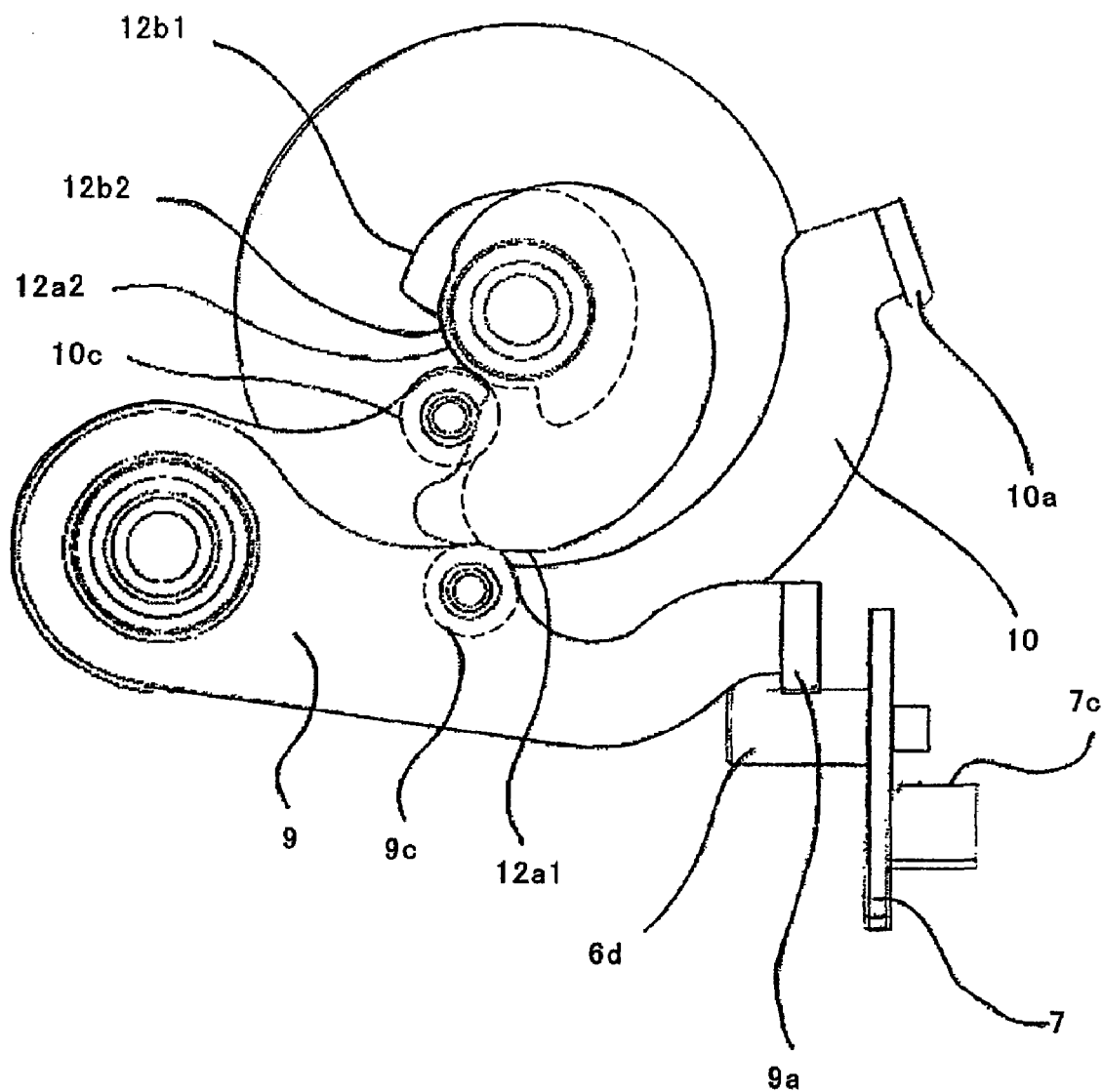
FIG. 9 shows the positions of the cam gear, a charge arm, and the hold release arm in the state of FIG. 6 when viewed from above the mirror box.
Figure 10:
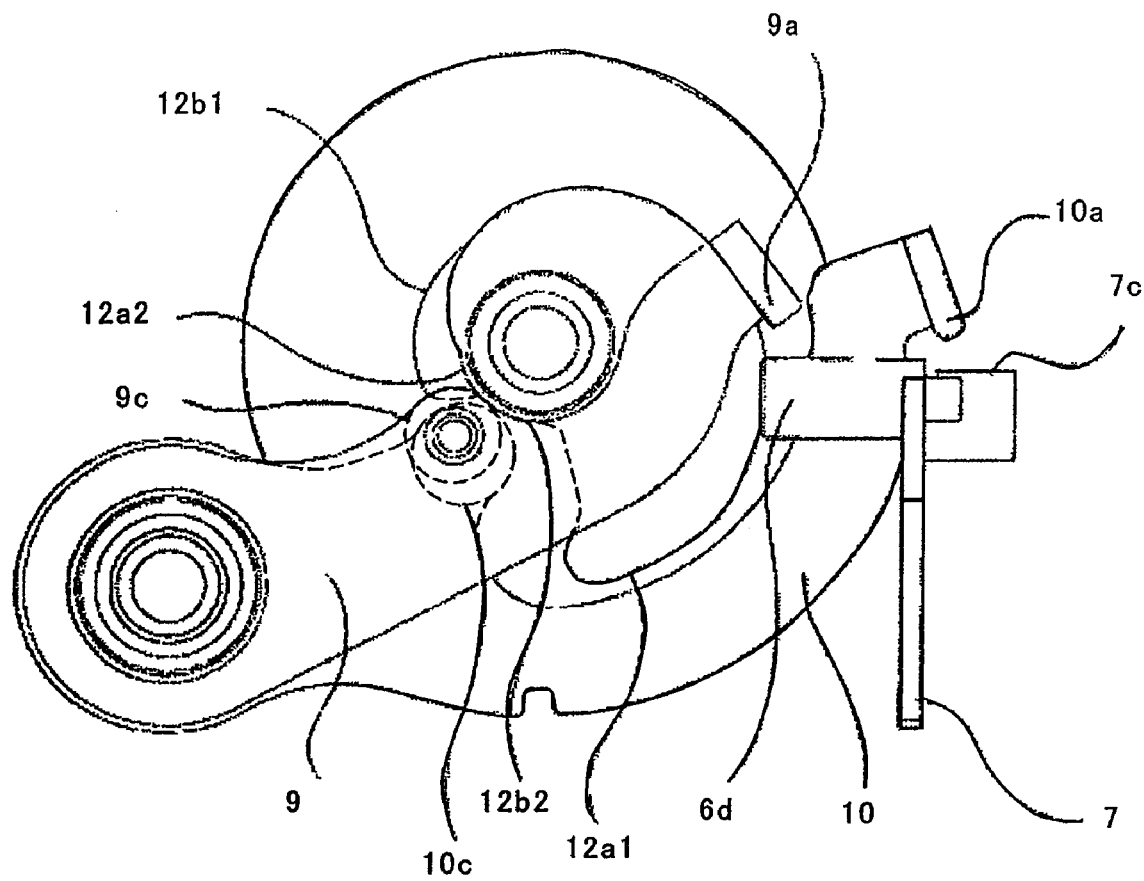
FIG. 10 shows the positions of the cam gear, the charge arm, and the hold release arm in the state of FIG. 7 when viewed from above the mirror box.
Figure 11:
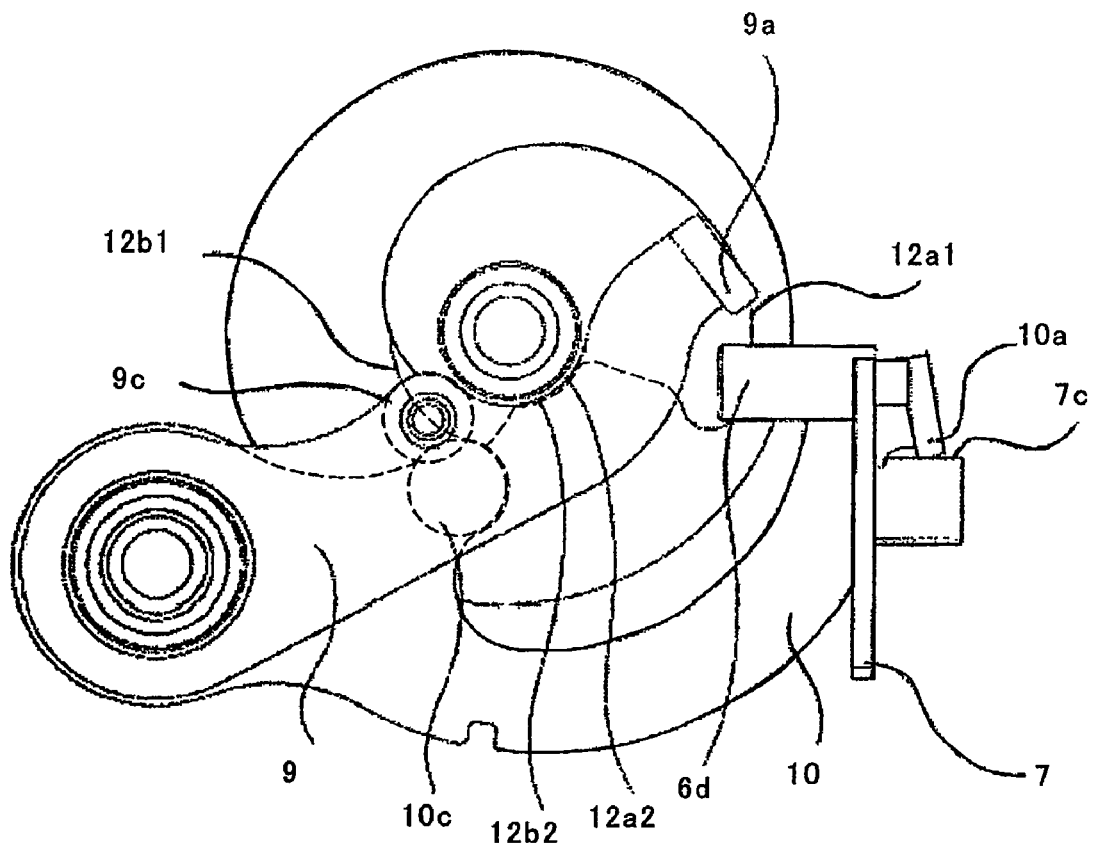
FIG. 11 shows the positions of the cam gear, the charge arm, and the hold release arm in the state of FIG. 8 when viewed from above the mirror box.

FIG. 9 shows the cam gear 12, the charge arm 9, and the hold release arm 10 in the state shown in FIG. 6 viewed from above the mirror box 1. FIG. 10 shows the cam gear 12, the charge arm 9, and the hold release arm 10 in the state shown in FIG. 7 viewed from above the mirror box 1. FIG. 11 shows the cam gear 12, the charge arm 9, and the hold release arm 10 in the state shown in FIG. 8 viewed from above the mirror box 1.

First, description will be made of how to control the drive of the cam gear 12 with reference to FIG. 4 showing the pattern of the phase detection substrate 14. When the motor 17 is rotated in a predetermined direction (for example, forward rotation), the driving force is transmitted to the gear portion 12c of the cam gear 12 through the decelerating planet mechanism 18 to rotate the cam gear 12 in one direction in accordance with the predetermined direction. At this point, the phase detection contact 13 fixed to the cam gear 12 moves on the pattern of the phase detection substrate 14 in a counterclockwise direction in FIG. 4.

The phase detection substrate 14 has three conductive patterns formed thereon, that is, a pattern 1 in accordance with a signal 1, a pattern 2 in accordance with a signal 2, and a GND pattern. When the phase detection contact 13 is located in the range of θ1 in which the pattern 2 is connected to the GND pattern with no contact with the pattern 1, the state shown in FIG. 6 is entered, that is, the movable mirror 2 is located in the image-taking optical axis at the viewfinder observing position, and the shutter set member 20 is set to the charge complete position.

When the phase detection contact 13 is located in the range of θ2 in which the pattern 1 is connected to the GND pattern with no contact with the pattern 2, the movable mirror 2 is driven from the viewfinder observing position toward the image-taking position outside the image-taking optical path, and the shutter set member 20 is driven from the charge complete position toward the charge release position. Thus, the state shown in FIG. 7 is entered, that is, the movable mirror 2 and the shutter set member 20 are set to the image-taking position and the charge release position, respectively.

When the phase detection contact 13 is located in the range of θ3 in which none of the pattern 1 and the pattern 2 are in contact with the GND pattern, the movable mirror 2 is driven from the image-taking position toward the viewfinder observing position. Thus, the state shown in FIG. 8 is entered, that is, the movable mirror 2 is set to the view finder observing position, and the shutter set member 20 remains in the charge release position. The cam gear 12 continues the rotation operation, and the mirror drive mechanism returns to the state shown in FIG. 6 from the state shown in FIG. 8.

An output signal from the phase detection substrate 14 is input to a control circuit, not shown. The control circuit operates to rotate the motor 17 from the rotational position of the cam gear 12 corresponding to the range of θ1 to the rotational position thereof corresponding to the range of θ2 in accordance with the ON operation of a release switch, not shown, and stops the rotation of the motor 17 simultaneously with the completion of the movement of the cam gear 12 to the position corresponding to the range of θ2.

Then, the control circuit controls the electromagnet, not shown, to cause the front curtain and the rear curtain, not shown, to travel, so that a predetermined shutter speed is provided. After the exposure sequence of the shutter is finished, the control circuit operates to rotate the motor 17 from the rotational position of the cam gear 12 corresponding to the range of θ2 to the rotational position thereof corresponding to the range of θ3, and to the rotational position thereof corresponding to the range of θ1, thereby preparing for the next image-taking operation.

Next, description will be made of the phase relationship between the charge gear 12a and the hold release cam 12b of the cam gear 12 with reference to FIG. 5 showing the cam lift arrangement of the cam gear 12 of FIG. 5.

In FIG. 5, the upper cam shows the charge cam 12, while the lower cam shows the hold release cam 12b. The cam gear 12 is rotated in one direction (counterclockwise direction) in response to the driving force of the motor 17.

When the phase detection contact 13 is located in the range of θ1 on the pattern of the phase detection substrate 14, the abutting point of the cam pin 9c of the charge arm 9 and the charge cam 12a and the abutting point of the cam pin 10c of the hold release arm 10 and the hold release cam 12b are located in the range of θ4.

The cam pin 9c of the charge arm 9 abuts on a lift top surface 12a1 of the charge cam 12a. The cam pin 10c of the hold release arm 10 abuts on a lift bottom surface 12b2 of the hold release cam 12b. The charge arm 9 and the hold release arm 10 are as shown in FIG. 9. The mirror drive mechanism is as shown in FIG. 6.

When the phase detection contact 13 is located in the range of θ2 on the pattern of the phase detection substrate 14, the abutting point of the cam pin 9c of the charge arm 9 and the charge cam 12a and the abutting point of the cam pin 10c of the hold release arm 10 and the hold release cam 12b are located in the range of θ5.

The cam pin 9c of the charge arm 9 abuts on a lift bottom surface 12a2 of the charge cam 12a. The cam pin 10c of the hold release arm 10 abuts on the lift bottom surface 12b2 of the hold release cam 12b. The charge arm 9 and the hold release arm 10 are as shown in FIG. 10. The mirror drive mechanism is as shown in FIG. 7.

When the phase detection contact 13 is located in the range of θ3 on the pattern of the phase detection substrate 14, the abutting point of the cam pin 9c of the charge arm 9 and the charge cam 12a and the abutting point of the cam pin 10c of the hold release arm 10 and the hold release cam 12b are located in the range of θ6.

Even when the cam gear 12 is further rotated to cause the cam pin 10c of the hold release arm 10 to move from the lift bottom surface 12b2 of the hold release cam 12b of the cam gear 12 to a lift top surface 12b1 and the cam pin 10c moves in contact with the lift top surface 12b1, the cam pin 9c of the charge arm 9 remains in contact with the lift bottom surface 12a2 of the charge cam 12a. The charge arm 9 and the hold release arm 10 are shown in FIG. 11, and the mirror drive mechanism is as shown in FIG. 8.

When the cam gear 12 is further rotated to the range of θ1, the charge arm 9 and the hold release arm 10 return to the state shown in FIG. 9, and the mirror drive mechanism returns to the state in FIG. 6, thereby preparing for the next image-taking operation.

Next, description will be made of the operation of the drive mechanism when the drive mechanism transitions from the state shown in FIGS. 6 and 9 to the state shown in FIGS. 7 and 10.

In the state shown in FIG. 6, the charge lever 6 which drives the shutter member 20 is driven in the counterclockwise direction with the charge arm engaging portion 9a of the charge arm 9, so that the spring receiving portion 6b of the charge lever 6 pushes the movable end 3b of the movable mirror drive spring 3 to the right. Thus, the movable mirror drive spring 3 is charged to allow the drive of the charge lever 6 in the clockwise direction and the shutter member 20 can be set to the charge complete position. At this point, the first movable mirror return spring 15 is not charged yet.

When the cam gear 12 is rotated in the counterclockwise direction from the abovementioned state in FIG. 9, the lift top surface 12a1 of the charge cam 12a which has abutted on the cam pin 9c of the charge arm 9 comes off, and the charge lever 6 is driven in the clockwise direction in FIG. 6 by the biasing force of the charged movable mirror drive spring 3. At this point, the charge lever engaging portion 6b of the charge lever 6 engages with the charge arm engaging portion 9a of the charge arm 9, so that the charge arm 9 is rotated in the counterclockwise direction around the shaft portion 1h of the mirror box 1 as shown in FIG. 10, and the cam pin 9c of the charge arm 9 abuts on the lift bottom surface 12a2 of the charge cam 12a.

The driving of the charge lever 6 from the state shown in FIG. 6 to the state shown in FIG. 7 causes the shutter charge portion 6c of the charge lever 6 to rotate upward the drive pin 20a of the shutter set member 20 pinched thereby to rotate the shutter set member 20 from the charge complete position in FIG. 6 to the charge release position in FIG. 7.

The shutter set member 20 is rotated from the charge complete position to the charge release position, and at the same time, the first hold lever engaging portion 7a formed in the hold lever 7 engages with the mirror drive lever engaging portion 4c provided for the mirror drive lever 4 to couple the mirror drive lever 4 to the charge lever 6 and drive the mirror drive lever 4 together with the charge lever 6 in the clockwise direction against the spring force of the mirror drive lever return spring 5.

The mirror drive lever 4 is rotated in the clockwise direction to cause the drive pin abutting portion 4b of the mirror drive lever 4 to abut on the mirror drive pin 2a of the movable mirror 2. Thus, the mirror drive lever 4 rotates the movable mirror 2 from the viewfinder observing position to the image-taking position shown in FIG. 7 through the mirror drive pin 2a. When an abutting portion 6g of the charge lever 6 abuts on the mirror up positioning portion 1p of the mirror box 1, the movable mirror 2 reaches the image-taking position and the shutter set member 20 reaches the charge release position as shown in FIG. 7.

In the state shown in FIG. 6, since the mirror return pin 2b of the movable mirror 2 abuts on the movable end 15b of the first movable mirror return spring 15, the movable mirror 2 is moved to the image-taking position (moved upward) to charge the first movable mirror return spring 15. In the state shown in FIG. 7, since the hold lever engaging portion 7a of the hold lever 7 engages with the mirror drive lever engaging portion 4c of the mirror drive lever 4, the mirror drive lever 4 can be prevented from rotation in the counterclockwise direction by the biasing force of the mirror drive lever return spring 5. As a result, the first movable mirror return spring 15 can be held in a charged state.

Next, description will be made of the operation of the mirror drive mechanism when it transitions from the state shown in FIGS. 7 and 10 to the state shown in FIGS. 8 and 11.

When the cam gear 12 is rotated in the counterclockwise direction from the state shown in FIG. 10, the cam pin 10c of the hold release arm 10 which has abutted on the lift bottom surface 12b2 of the hold release cam 12b of the cam gear 12 in FIG. 7 lies on and abuts on the lift top surface 12b1 of the hold release cam 12b. Since the cam pin 10c of the hold release arm 10 moves from the lift bottom surface 12b2 of the hold release cam 12b to the lift top surface 12b1, the hold release arm 10 is rotated around the shaft portion 1h of the mirror box 1 in the clockwise direction and moved to the state shown in FIG. 11 against the biasing force of the hold release arm return spring 11.

The rotation of the hold release arm 10 in the clockwise direction causes the hold release arm engaging portion 10a of the hold release arm 10 to move the second hold lever engaging portion 7c of the hold lever 7 downward in FIG. 11.

The downward movement of the second hold lever engaging portion 7c of the hold lever 7 in FIG. 11 causes the hold lever 7 to rotate in the counterclockwise direction around the hold lever attaching portion 6e of the charge lever 6 against the biasing force of the hold lever return spring 8. When the cam gear 12 is rotated to the state shown in FIG. 11, the hold lever 7 is rotated to the state shown in FIG. 8.

When the hold lever 7 is rotated to the state shown in FIG. 8 in this manner, the engagement of the hold lever 7 with the mirror drive lever 4 is released. The mirror drive lever 4 is rotated in the counterclockwise direction around the shaft portion 1b of the mirror box 1 by the biasing force of the mirror drive lever return spring 5. After the start of the rotation operation, the mirror drive lever 4 is rotated to the state in FIG. 8 in which it is stopped by the abutting portion 4d abutting on the mirror down positioning portion 1q of the mirror box 1.

When the mirror drive lever 4 is rotated in the counterclockwise direction, the mirror drive pin abutting portion 4b which has abutted on the mirror drive pin 2a comes off. The movable mirror 2 is rotated in the clockwise direction and is moved from the image-taking position in FIG. 7 to the viewfinder observing position in FIG. 8 by the biasing force of the charged first movable mirror return spring 15 and the second movable mirror return spring 16.

Next, description will be made of the operation of the mirror drive mechanism when it transitions from the state shown in FIGS. 8 and 11 to the state shown in FIGS. 6 and 9.

When the cam gear 12 is rotated in the counterclockwise direction from the state shown in FIG. 11, the lift top surface 12b1 of the hold release cam 12b of the cam gear 12 comes off, and the cam pin 10c of the hold release arm 10 abuts on the lift bottom surface 12b2 of the hold release cam 12b by the urge of the hold release arm return spring 11. When the cam pin 10c of the hold release arm 10 abuts on the lift bottom surface 12b2 of the hold release cam 12b, the hold release arm 10 is moved to the position in FIG. 9.

When the cam gear 12 is rotated in the counterclockwise direction from the state shown in FIG. 11, the cam pin 9c of the charge arm 9c which has abutted on the lift bottom surface 12a2 of the charge cam 12a of the cam gear 12 abuts on the lift top surface 12a1 of the charge cam 12a. When the cam pin 9c of the charge arm 9 moves to the lift top surface 12a1 of the charge cam 12a, the charge arm 9 is rotated and moved to the position in FIG. 9.

When the charge is rotated in the counterclockwise direction, the charge arm engaging portion 9a of the charge arm 9 engages with the charge lever engaging portion 6d of the charge lever 6 to rotate the charge lever 6 in the counterclockwise direction. The counterclockwise rotation of the charge lever 6 charges the movable mirror drive spring 3 whose movable ends 3b and fixed end 3a are supported on the spring receiving portion 6b of the charge lever 6 and the pole 1g of the mirror box 1, respectively.

Since the shutter charge portion 6c of the charge lever 6 pushes down the drive pin 20a of the shutter set member 20 simultaneously, the shutter set member 20 is rotated toward the charge complete state shown in FIG. 6. When the cam pin 9c of the charge arm 9 abuts on the lift top surface 12a1 of the charge cam 12a of the cam gear 12, the shutter set member 20 reaches the charge complete position, and the electromagnet, not shown, holds the front curtain and the rear curtain, not shown, in the charge complete state by its absorption.

The first hold lever engaging portion 7a of the hold lever 7 is in slide contact with the mirror drive lever engaging portion 4c of the mirror drive lever 4. As soon as the first hold lever engaging portion 7a is moved to the right of the mirror drive lever engaging portion 4c, the hold lever 7 is rotated in the clockwise direction by the biasing force of the hold lever return spring 8. Thus, the first hold lever engaging portion 7a is pushed down, and as shown in FIG. 6, the first hold lever engaging portion 7a of the hold lever 7 is moved to the position where it can lock the mirror drive lever engaging portion 4c of the mirror drive lever 4.

In this manner, the state in FIG. 6 is moved to the state in FIG. 7, and to the state in FIG. 8, and returns to the state in FIG. 6. In other words, the cam gear 12 is rotated 360 degrees. Thus, one image-taking operation is completed.

Since the rotation of the cam gear 12 in one direction can drive the movable mirror 2 and the shutter member 20, the drive control of the motor 17 can be simplified to realize the mirror drive mechanism by taking account of load distribution.

Since the load distribution is considered, it is possible to provide the mirror drive apparatus which consumes less power even when the same driving force is used to drive the mirror and the shutter.

The charge cam 12a and the hold release cam 12b are formed of one member and they are driven in one direction around the same axis to allow the driving of the drive mechanism for the mirror and the shutter. Thus, high drive efficiency is achieved, and a phase shift between two cams due to assembly errors can be prevented. As a result, it is possible to provide the mirror drive apparatus with less power consumption and high accuracy.

In this manner, according to Embodiment 1, the motor can drive the first and second cams only on direction to move the mirror to the first and second positions. Thus, when the driving force of the motor rotated in the other direction can be applied to driving of another drive mechanism (for example, driving of the flash unit, driving of load/unload of a recording medium, and driving of film feed and driving of load/unload of a film cartridge for a film camera). Consequently, driving the other drive mechanism does not need the use of another motor, thereby making it possible to provide the mirror drive apparatus which has a smaller number of constituent parts, allows easy assembly, and requires low cost.

Embodiment 2

Description will hereinafter be made of the structure of a single-lens reflex digital camera which is Embodiment 2 of the present invention. The basic structure and operation of the camera of Embodiment 2 are the same as those described in Embodiment 1 with reference to FIGS. 1 to 4 and FIGS. 6 to 8. Thus, the common structure will be described with reference to the same drawings or omitted.

Figure 12:
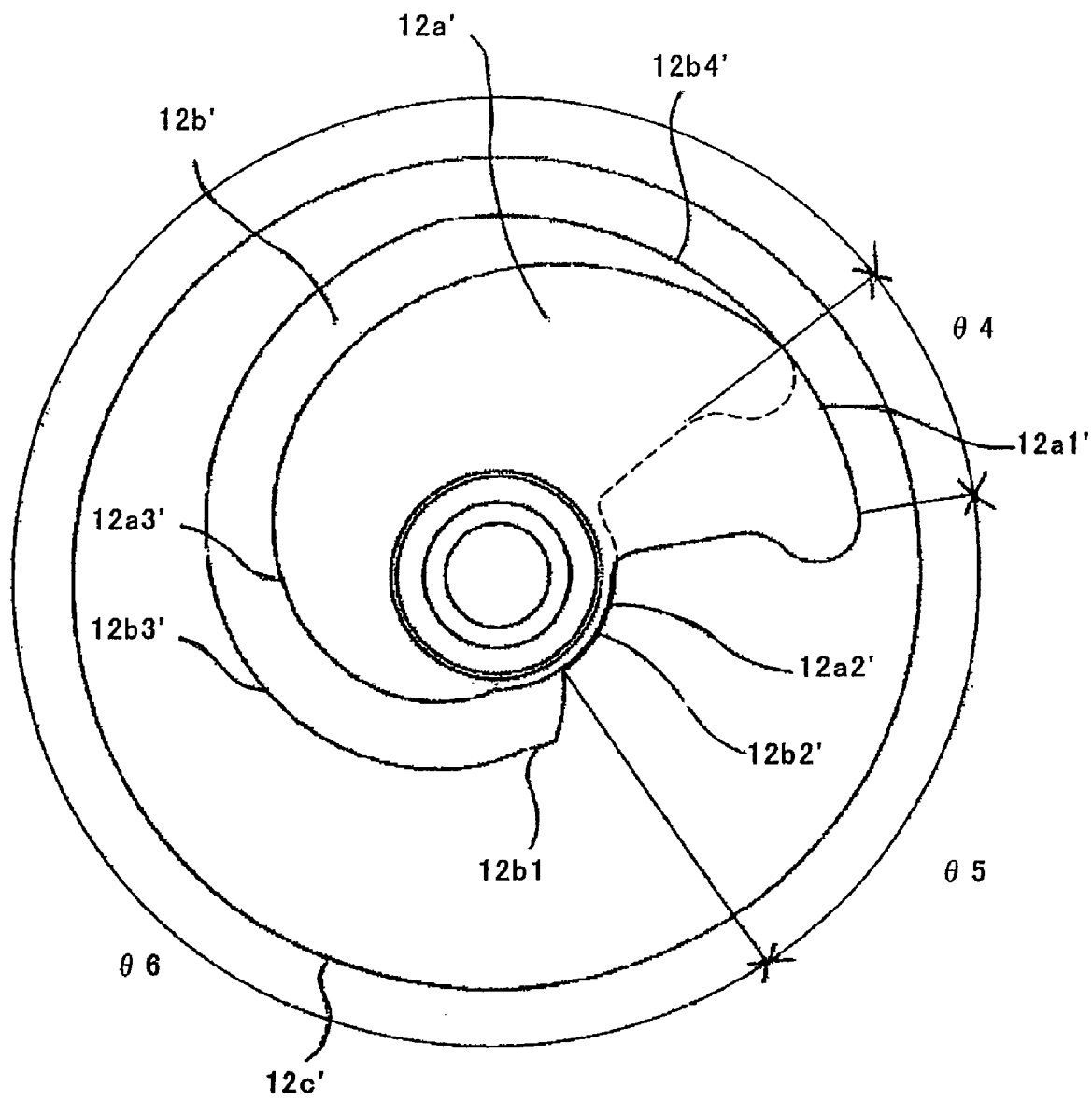
FIG. 12 shows a mirror drive cam and a hold release cam of a cam gear in a camera which is Embodiment 2 of the present invention.

In Embodiment 2, the shape of a cam gear 12' shown in FIG. 12 differs from that of the cam gear 12 in Embodiment 1. In FIGS. 4 and 6 to 8, the cam gear 12 can be regarded as the cam gear 12'.

Description will be made of how to operate and control a mirror and shutter drive mechanism with reference to FIGS. 4, 6 to 8, and 12 to 17. FIG. 4 shows the pattern of a phase detection substrate 14 which detects the rotational position of the cam gear 12'. FIG. 6 shows the mirror and shutter drive mechanism when a movable mirror 2 is at a viewfinder observing position and a shutter set member 20 is at a charge complete position, that is, an image-taking standby state.

Figure 13:
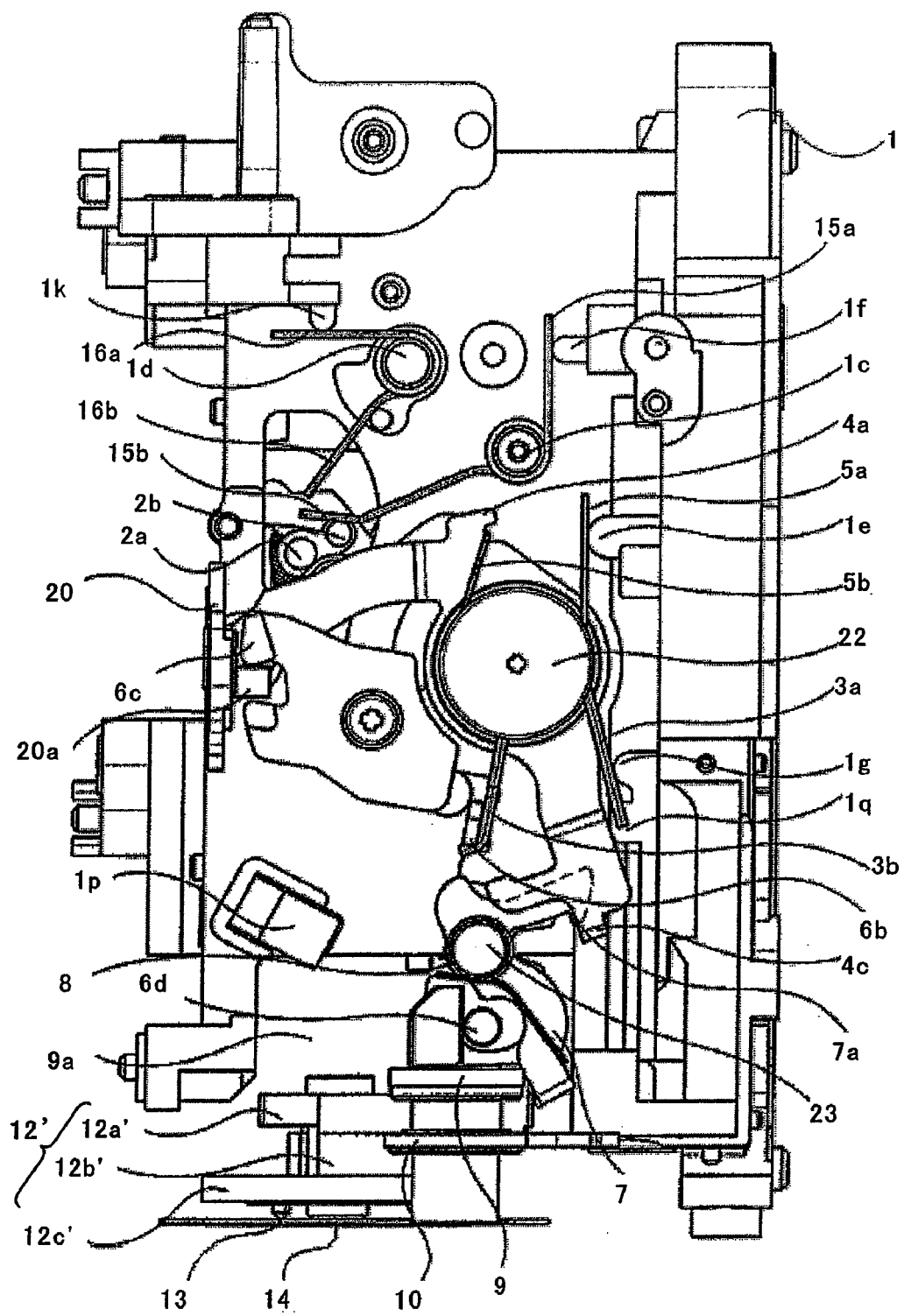
FIG. 13 is a side view showing a mirror and shutter drive mechanism when a movable mirror is at a viewfinder observing position, a shutter set member is moving to a charge complete position, and a hold lever is at a position immediately before it engages with a mirror lever in Embodiment 2.

FIG. 7 shows the mirror and shutter drive mechanism when the movable mirror 2 is at an image-taking position and the shutter set member 20 is at a charge release position, that is, a mirror up state. FIG. 8 shows the mirror and shutter drive mechanism when the movable mirror 2 is at the viewfinder observing position and the shutter set member 20 is at the charge release position, that is, a mirror down state. FIG. 13 shows the mirror and shutter drive mechanism when the movable mirror 2 is at the viewfinder observing position, the shutter set member 20 is being charged, and a hold lever 7 is in a state immediately before it engages with a mirror drive lever.

Figure 14:
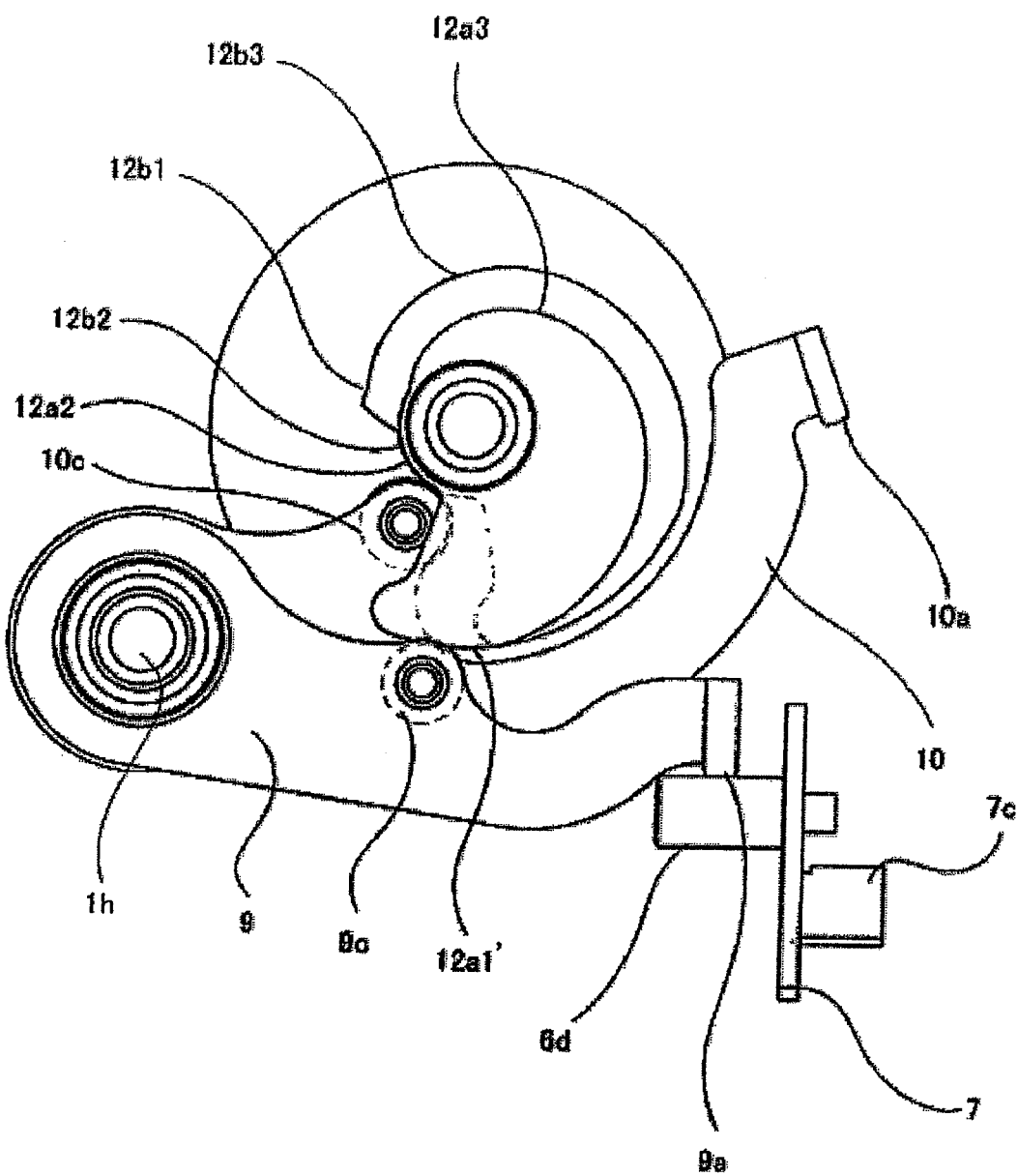
FIG. 14 shows the positions of a cam gear, a charge arm, and a hold release arm in the state of FIG. 6 when viewed from above a mirror box in Embodiment 2.
Figure 15:
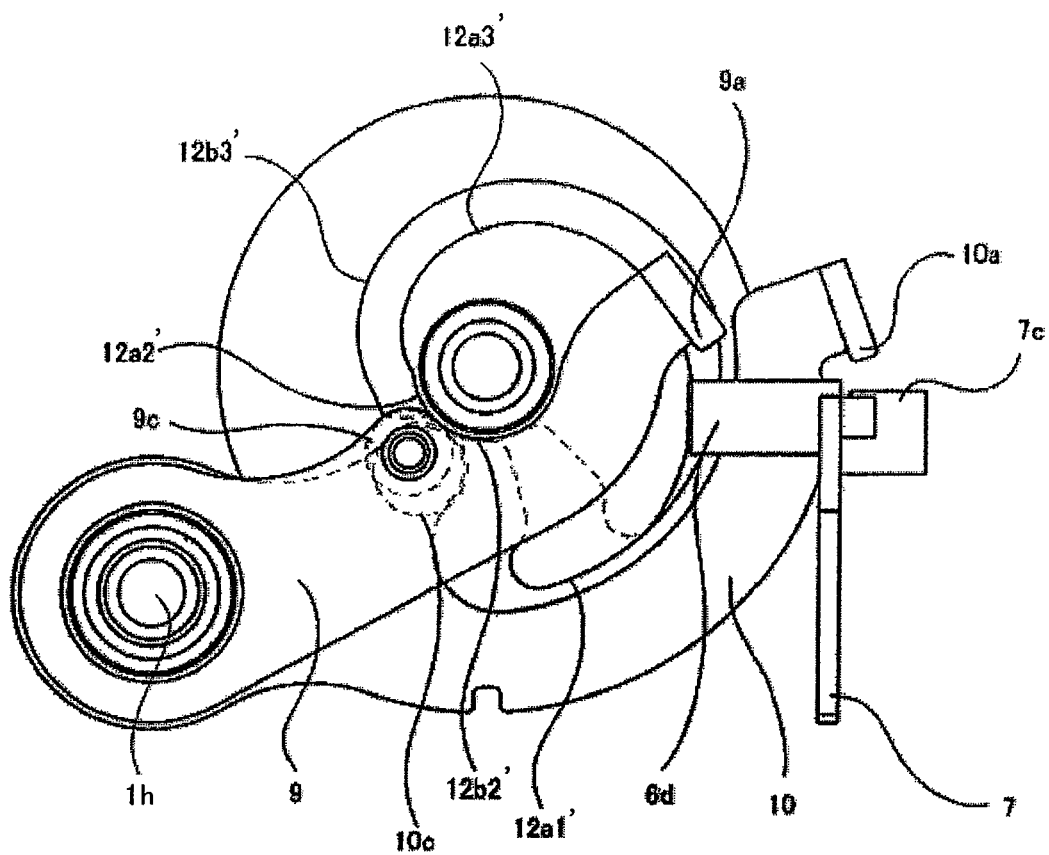
FIG. 15 shows the positions of the cam gear, the charge arm, and the hold release arm in the state of FIG. 7 when viewed from above the mirror box in Embodiment 2.
Figure 16:
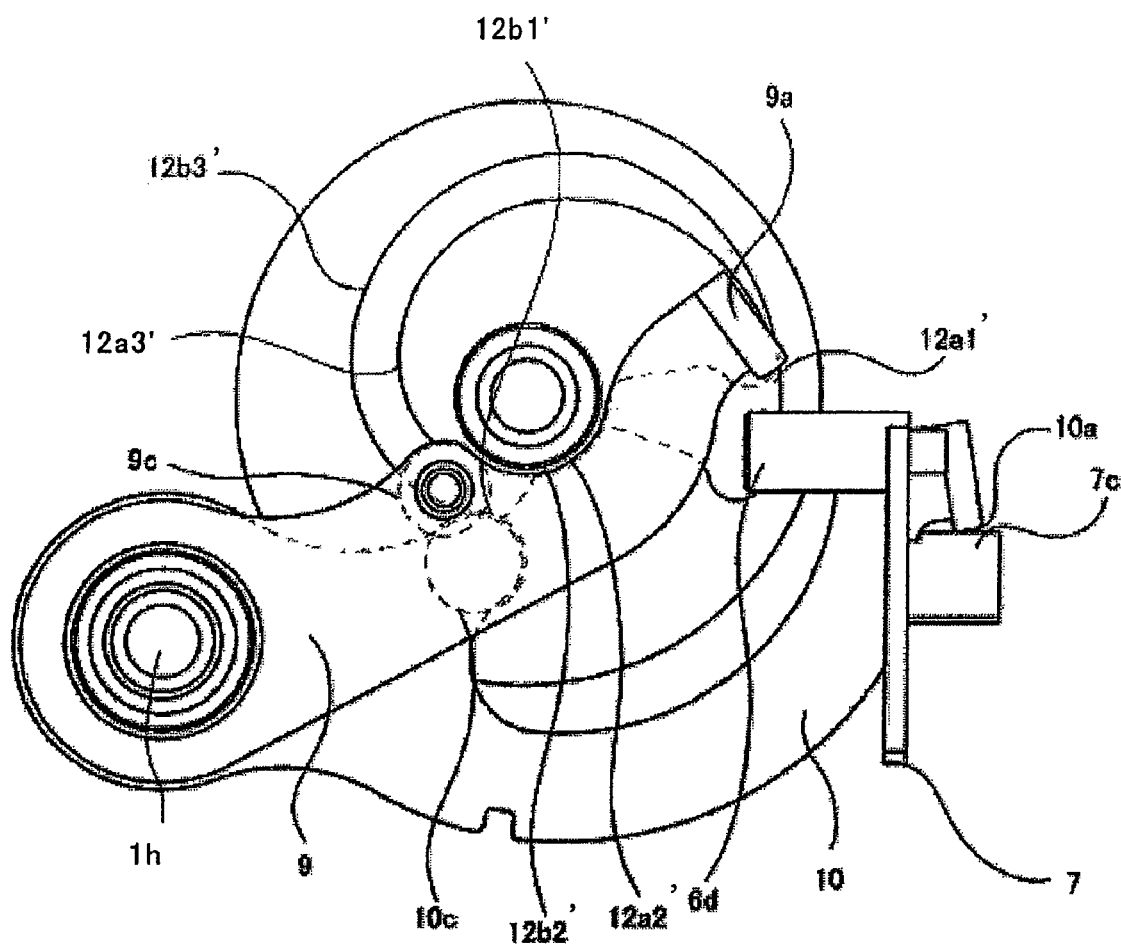
FIG. 16 shows the positions of the cam gear, the charge arm, and the hold release arm in the state of FIG. 8 when viewed from above the mirror box in Embodiment 2.
Figure 17:
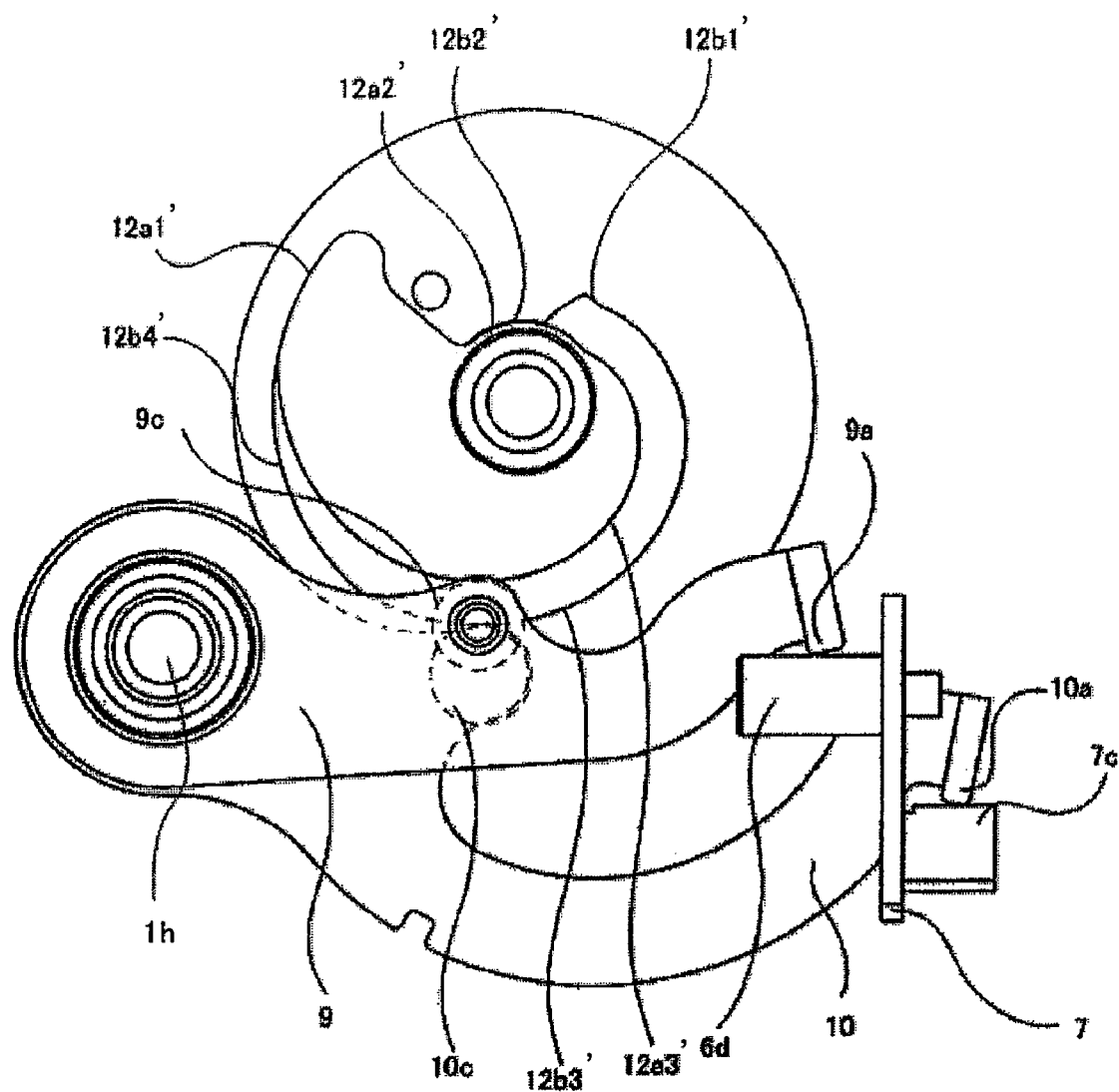
FIG. 17 shows the positions of the cam gear, the charge arm, and the hold release arm in the state of FIG. 13 when viewed from above the mirror box in Embodiment 2.

FIG. 14 shows the cam gear 12', a charge arm 9, and a hold release arm 10 in the state shown in FIG. 6 viewed from above a mirror box 1. FIG. 15 shows the cam gear 12', the charge arm 9, and the hold release arm 10 in the state shown in FIG. 7 viewed from above the mirror box 1. FIG. 16 shows the cam gear 12', the charge arm 9, and the hold release arm 10 in the state shown in FIG. 8 viewed from above the mirror box 1. FIG. 17 shows the cam gear 12', the charge arm 9, and the hold release arm 10 in the state shown in FIG. 13 viewed from above the mirror box 1. FIG. 12 shows the phase relationship between a charge cam 12a' of the cam gear 12' and a hold release cam 12b'.

First, description will be made of how to control the driving of the cam gear 12' with reference to FIG. 4 showing the pattern of the phase detection substrate 14. When a motor 17 is rotated in a predetermined direction (for example, forward rotation), the driving force is transmitted to a gear portion 12c' of the cam gear 12' through a decelerating planet mechanism 18 to rotate the cam gear 12' in one direction in accordance with the predetermined direction. At this point, a phase detection contact 13 fixed to the cam gear 12' moves on the pattern of the phase detection substrate 14 in a counterclockwise direction in FIG. 4.

The phase detection substrate 14 has three conductive patterns formed thereon, that is, a pattern 1 in accordance with a signal 1, a pattern 2 in accordance with a signal 2, and a GND pattern. When the phase detection contact 13 is located in the range of θ1 in which the pattern 2 is connected to the GND pattern with no contact with the pattern 1, the state shown in FIG. 6 is entered, that is, the movable mirror 2 is located in an image-taking optical axis at the viewfinder observing position, and the shutter set member 20 is set to the charge complete position.

When the phase detection contact 13 is located in the range of θ2 in which the pattern 1 is connected to the GND pattern with no contact with the pattern 2, the movable mirror 2 is driven from the viewfinder observing position toward the image-taking position outside the image-taking optical path, and the shutter set member 20 is driven from the charge complete position toward the charge release position. Thus, the state shown in FIG. 7 is entered, that is, the movable mirror 2 and the shutter set member 20 are set to the image-taking position and the charge release position, respectively.

When the phase detection contact 13 is located in the range of θ3 in which none of the pattern 1 and the pattern 2 are in contact with the GND pattern, the movable mirror 2 is driven from the image-taking position toward the viewfinder observing position. Thus, the state shown in FIG. 8 is entered, that is, the movable mirror 2 is set to the view finder observing position, and the shutter set member 20 remains in the charge release position.

The cam gear 12 continues the rotation operation, and the mirror and shutter drive mechanism moves from the state shown in FIG. 8 to the state shown in FIG. 13, that is, the state during the charging of the shutter set member 20 to the charge complete position and immediately before the engagement of the hold lever 7 with the mirror drive lever 4. In addition, the state is moved to the state shown in FIG. 6, that is, the image-taking standby state in which the shutter set member 20 is moved to the charge complete position and the hold lever 7 is engageable with the mirror drive lever 4.

An output signal from the phase detection substrate 14 it input to a control circuit, not shown. The control circuit operates to rotate the motor 17 from the rotational position of the cam gear 12' corresponding to the range of θ1 to the rotational position thereof corresponding to the range of θ2 in accordance with the ON operation of a release switch, not shown, and stops the rotation of the motor 17 simultaneously with the completion of the movement of the cam gear 12' to the position corresponding to the range of θ2.

Then, the control circuit controls the electromagnet, not shown, to cause the front curtain (205a in FIG. 18) and the rear curtain (205b in FIG. 18) to travel, so that a predetermined shutter speed is provided. After the exposure sequence of the shutter is finished, the control circuit drives the motor 17 to rotate from the rotational position of the cam gear 12' corresponding to the range of θ2 to the rotational position thereof corresponding to the range of θ3, and to the rotational position thereof corresponding to the range of θ1, thereby preparing for the next image-taking operation.

Next, description will be made of the phase relationship between the charge gear 12a' and the hold release cam 12b' of the cam gear 12' with reference to FIG. 12 showing the cam lift arrangement of the cam gear 12'.

In FIG. 12, the upper cam shows the charge cam 12a', while the lower cam shows the hold release cam 12b'. The cam gear 12' is rotated in one direction (counterclockwise direction) in response to the driving force of the motor 17.

When the phase detection contact 13 is located in the range of θ1 on the pattern of the phase detection substrate 14, the abutting point of a cam pin 9c of the charge arm 9 and the charge cam 12a' and the abutting point of a cam pin 10c of the hold release arm 10 and the hold release cam 12b are located in the range of θ4.

The cam pin 9c of the charge arm 9 abuts on a lift top surface 12a1' of the charge cam 12a'. The cam pin 10c of the hold release arm 10 abuts on a lift bottom surface 12b2' of the hold release cam 12b'. The charge arm 9 and the hold release arm 10 are as shown in FIG. 14. The mirror and shutter drive mechanism is as shown in FIG. 6.

When the phase detection contact 13 is located at a rotational position in the range of θ2 on the pattern of the phase detection substrate 14, the abutting point of the cam pin 9c of the charge arm 9 and the charge cam 12a' and the abutting point of the cam pin 10c of the hold release arm 10 and the hold release cam 12b' are located in the range of θ5.

The cam pin 9c of the charge arm 9 abuts on a lift bottom surface 12a2' of the charge cam 12a'. The cam pin 10c of the hold release arm 10 abuts on the lift bottom surface 12b2' of the hold release cam 12b'. The charge arm 9 and the hold release arm 10 are as shown in FIG. 15. The mirror and shutter drive mechanism is as shown in FIG. 7.

When the phase detection contact 13 is located in the range of θ3 on the pattern of the phase detection substrate 14, the abutting point of the cam pin 9c of the charge arm 9 and the charge cam 12a' and the abutting point of the cam pin 10c of the hold release arm 10 and the hold release cam 12b' are located in the range of θ6.

Even when the cam gear 12' is further rotated to cause the cam pin 10c of the hold release arm 10 to move from the lift bottom surface 12b2' of the hold release cam 12b' of the cam gear 12' to a lift top surface 12b1' and the cam pin 10c moves in contact with the lift top surface 12b1', the cam pin 9c of the charge arm 9 remains in contact with the lift bottom surface 12a2' of the charge cam 12a'. The charge arm 9 and the hold release arm 10 are shown in FIG. 16, and the mirror and shutter drive mechanism is as shown in FIG. 8.

When the cam gear 12' is further rotated, the cam pin 9c of the charge arm 9 abuts on a lift surface 12a3' of the charge cam 12a', and the cam pin 10c of the hold release arm 10 abuts on a charge lift surface 12b3' of the hold release cam 12b'. The charge arm 9 and the hold release arm 10 are shown in FIG. 17, and the mirror and shutter drive mechanism is shown in FIG. 13.

When the cam gear 12' is further rotated to the range of θ1, the charge arm 9 and the hold release arm 10 return to the state shown in FIG. 14, and the mirror and shutter drive mechanism returns to the state in FIG. 6, thereby preparing for the next image-taking operation.

Next, description will be made of the operation when the mirror and shutter drive mechanism transitions from the state shown in FIGS. 6 and 14 to the state shown in FIGS. 7 and 15.

In the state shown in FIG. 6, a charge lever 6 which drives the shutter member 20 is driven in the counterclockwise direction with a charge arm engaging portion 9a of the charge arm 9, so that a spring receiving portion 6b of the charge lever 6 pushes a movable end 3b of a movable mirror drive spring 3 to the right. Thus, the movable mirror drive spring 3 is charged to allow the drive of the charge lever 6 in the clockwise direction and the shutter member 20 can be set to the charge complete position. At this point, a first movable mirror return spring 15 is not charged yet.

When the cam gear 12' is rotated in the counter clockwise direction from the abovementioned state in FIG. 14, the lift top surface 12a1' of the charge cam 12a' which has abutted on the cam pin 9c of the charge arm 9 comes off, and the charge lever 6 is driven in the clockwise direction in FIG. 6 by the biasing force of the charged movable mirror drive spring 3. At this point, a charge lever engaging portion 6d of the charge lever 6 engages with the charge arm engaging portion 9a of the charge arm 9, so that the charge arm 9 is rotated in the counterclockwise direction around a shaft portion 1h of the mirror box 1 as shown in FIG. 15, and the cam pin 9c of the charge arm 9 abuts on the lift bottom surface 12a2' of the charge cam 12a'.

The charge arm 9 enters the state in FIG. 11 to cause the charge lever 6 urged in the clockwise direction by the movable mirror drive spring 3 in FIG. 6 to be rotated in the clockwise direction around a shaft portion 1b of the mirror box 1.

The movement of the charge lever 6 from the state shown in FIG. 6 to the state shown in FIG. 7 causes a shutter charge portion 6c of the charge lever 6 to rotate upward a drive pin 20a of the shutter set member 20 pinched thereby to rotate the shutter set member 20 from the charge complete position in FIG. 6 to the charge release position in FIG. 7.

The shutter set member 20 is rotated from the charge complete position to the charge release position, and at the same time, a first hold lever engaging portion 7a formed in the hold lever 7 engages with a mirror drive lever engaging portion 4c provided for the mirror drive lever 4 to couple the mirror drive lever 4 to the charge lever 6 and drive the mirror drive lever 4 together with the charge lever 6 in the clockwise direction against the spring force of the mirror drive lever return spring 5.

The mirror drive lever 4 is rotated in the clockwise direction to cause a drive pin abutting portion 4b of the mirror drive lever 4 to abut on a mirror drive pin 2a of the movable mirror 2. Thus, the mirror drive lever 4 rotates the movable mirror 2 from the viewfinder observing position to the image-taking position shown in FIG. 7 through the mirror drive pin 2a. When an abutting portion 6g of the charge lever 6 abuts on a mirror up positioning portion 1p of the mirror box 1, the movable mirror 2 reaches the image-taking position and the shutter set member 20 reaches the charge release position as shown in FIG. 7. In the state shown in FIG. 6, since a mirror return pin 2b of the movable mirror 2 abuts on a movable end 15b of the first movable mirror return spring 15, the movable mirror 2 is moved to the image-taking position (moved upward) to charge the first movable mirror return spring 15.

In the state shown in FIG. 7, since the hold lever engaging portion 7a of the hold lever 7 engages with the mirror drive lever engaging portion 4c of the mirror drive lever 4, the mirror drive lever 4 can be prevented from rotation in the counterclockwise direction by the biasing force of the mirror drive lever return spring 5. As a result, the first movable mirror return spring 15 can be held in a charged state.

Next, description will be made of the operation of the mirror and shutter drive mechanism when the state shown in FIGS. 7 and 15 is moved to the state shown in FIGS. 8 and 16.

When the cam gear 12' is rotated in the counter clockwise direction from the state shown in FIG. 15, the cam pin 10c of the hold release arm 10 which has abutted on the lift bottom surface 12b2' of the hold release cam 12b' of the cam gear 12' in FIG. 7 lies on and abuts on the lift top surface 12b1' of the hold release cam 12b'. Since the cam pin 10c of the hold release arm 10 moves from the lift bottom surface 12b2' of the hold release cam 12b' to the lift top surface 12b1', the hold release arm 10 is rotated around the shaft portion 1h of the mirror box 1 in the clockwise direction and moved to the state shown in FIG. 16 against the biasing force of the hold release arm return spring 11.

The rotation of the hold release arm 10 in the clockwise direction causes a hold release arm engaging portion 10a of the hold release arm 10 to move a second hold lever engaging portion 7c of the hold lever 7 downward in FIG. 16.

The downward movement of the second hold lever engaging portion 7c of the hold lever 7 in FIG. 16 causes the hold lever 7 to rotate in the counterclockwise direction around a hold lever attaching portion 6e of the charge lever 6 against the biasing force of a hold lever return spring 8. When the cam gear 12' is rotated to the state shown in FIG. 16, the hold lever 7 is rotated to the state shown in FIG. 8.

When the hold lever 7 is rotated to the state shown in FIG. 8 in this manner, the engagement of the hold lever 7 with the mirror drive lever 4 is released. The mirror drive lever 4 is rotated in the counterclockwise direction around the shaft portion 1b of the mirror box 1 by the biasing force of the mirror drive lever return spring 5. After the start of the rotational operation, the mirror drive lever 4 is rotated to the state in FIG. 8 in which it is stopped by an abutting portion 4d abutting on a mirror down positioning portion 1q of the mirror box 1.

When the mirror drive lever 4 is rotated in the counterclockwise direction, the mirror drive pin abutting portion 4b which has abutted on the mirror drive pin 2a comes off. The movable mirror 2 is rotated in the clockwise direction and is moved from the image-taking position in FIG. 7 to the viewfinder observing position in FIG. 8 by the biasing force of the charged first movable mirror return spring 15 and the second movable mirror return spring 16.

Next, description will be made of the operation of the mirror and shutter drive mechanism when it transitions from the state shown in FIGS. 8 and 16 to the state shown in FIGS. 13 and 17.

When the cam gear 12' is further rotated in the counterclockwise direction from the state shown in FIG. 16, the cam pin 9c which has abutted on the lift bottom surface 12a2' of the charge cam 12a' abuts on the lift surface 12a3' of the charge cam 12a', and the cam pin 10c which has abutted on the lift top surface 12b1' of the hold release cam 12b' abuts on the charge lift surface 12b3' of the hold release cam 12b'.

Since the cam pin 9c abuts on the lift surface 12a3' of the charge cam 12a', the charge arm 9 is driven and rotated to the position in FIG. 17.

Since the cam pin 10c abuts on the charge lift surface 12b3' of the hold release cam 12b', the hold release arm 10 is drive and rotated to the position in FIG. 17.

When the charge arm 9 is rotated in the clockwise direction, the charge arm engaging portion 9a engages with the charge lever engaging portion 6d to cause the charge lever 6 to be rotated in the counterclockwise direction when viewed in the axis direction of the shaft portion 1b. The counterclockwise rotation of the charge lever 6 charges the movable mirror drive spring 3 whose movable ends 3b and fixed end 3a are supported on the spring receiving portion 6b of the charge lever 6 and a pole 1g of the mirror box 1, respectively.

When the hold release arm 10 is rotated in the clockwise direction, the hold release arm engaging portion 10a abuts on the second hold lever engaging portion 7c and push it to the right, so that the hold lever 7 is rotated in the counterclockwise direction around the shaft portion 6e when the charge lever 6 is rotated in the counterclockwise direction.

Since the hold lever 7 is driven in the counterclockwise direction around the shaft portion 6e in this manner, the hold lever 7 can be retracted to the position at which the end of the first hold lever engaging portion 7a does not collide with the mirror drive lever engaging portion 4c when the charge lever 6 is rotated to the state in FIG. 13. Thus, the collision between the mirror drive lever engaging portion 4c and the first hold lever engaging portion 7a can be avoided to enhance the durability of the mirror drive lever 4 and the hold lever 7. As a result, it is possible to provide a durable camera.

In addition, since the shutter charge portion 6c of the charge lever 6 pushes down the drive pin 20a of the shutter set member 20, the shutter set member 20 is rotated to the state shown in FIG. 13.

Next, description will be made of the operation of the mirror and shutter drive mechanism when it transitions from the state shown in FIGS. 13 and 17 to the state shown in FIGS. 6 and 14.

When the cam gear 12' is rotated in the counterclockwise direction from the state shown in FIG. 17, a charge lift top surface 12b4' of the hold release cam 12b' comes off. Since the hold release arm 10 is urged by the hold release arm return spring 11 for rotation in the clockwise direction, the cam pin 10c abuts on the lift bottom surface 12b2' of the hold release cam 12b'.

When the cam pin 10c abuts on the lift bottom surface 12b2' of the hold release cam 12b', the hold release arm 10 is moved to the position in FIG. 14. When the hold release arm 10 reaches the position in FIG. 14, the engagement of the hold lever 7 with the hold release arm 10 is released, and as shown in FIG. 6, the first hold lever engaging portion 7a is moved in contact with the mirror drive lever engaging portion 4c. When the contact of the first hold lever engaging portion 7a with the mirror drive lever engaging portion 4c is broken, the hold lever 7 receiving the biasing force from the hold lever return spring 8 starts rotation operation in the clockwise direction to push down the first hold lever engaging portion 7a. As a result, the first hold lever engaging portion 7a is moved to the position at which it locks the mirror drive lever engaging portion 4c as shown in FIG. 6.

When the cam gear 12' is rotated in the counter clockwise direction from the state shown in FIG. 17, the cam pin 9c which has abutted on the charge lift surface 12a3' of the charge cam 12a' of the cam gear 12' abuts on the lift top surface 12a1' of the charge cam 12a'. As the cam pin 9c moves on the lift top surface 12a1' of the charge cam 12a', the charge arm 9 is driven and rotated to the position in FIG. 14.

When the charge arm 9 is further rotated in the clockwise direction from the state, the charge lever 6 is further rotated in the counterclockwise direction since the charge arm engaging portion 9a engages with the charge lever engaging portion 6d. The counterclockwise rotation of the charge lever 6 fully charges the movable mirror drive spring 3 whose movable ends 3b and fixed end 3a are supported on the spring receiving portion 6b of the charge lever 6 and a pole 1g of the mirror box 1, respectively.

Simultaneously, the shutter charge portion 6c pushes down the drive pin 20a of the shutter set member 20, so that the shutter set member 20 is rotated toward the charge complete position shown in FIG. 6. When the cam pin 9c abuts on the lift top surface 12a1' of the charge cam 12a', the charge of the shutter set member 20 is completed, and the electromagnet, not shown, holds the front curtain (205a in FIG. 18) and the rear curtain (205b in FIG. 18) in the charge complete state by its absorption.

In this manner, the state in FIG. 6 is moved to the state in FIG. 7, to the state in FIG. 8, and to the state in FIG. 13, and returns to the state in FIG. 6. In other words, the cam gear 12' is rotated 360 degrees. Thus, one image-taking operation is completed.

According to Embodiment 2, since the engaging member can be retracted from the mirror in the relative movement of the mirror and the engaging member toward the position at which they can engage, the collision between the engaging member and the mirror can be avoided.

In addition, since the second cam which releases the engagement of the engaging member with the mirror is used to retract the engaging member from the mirror, it is possible to avoid collision between the engaging member and the mirror without adding a new part. Thus, the image-taking apparatus can be reduced in size.

This application claims foreign priority benefits based on Japanese Patent Applications Nos. 2004-173600, filed on Jun. 11, 2004, and 2004-177543, filed on Jun. 15, 2004, and each of which is hereby incorporated by reference herein in its entirety as if fully set forth herein.

What is claimed is:

1. An image-taking apparatus comprising:
    a mirror, which is movable with respect to an optical path;
    a mirror drive member, which is movable to a first position at which the mirror is disposed in the optical path and to a second position at which the mirror is retracted outside the optical path;
    a first biasing member, which produces biasing force for driving the mirror drive member from the second position to the first position;
    a second biasing member, which produces biasing force for driving the mirror drive member from the first position to the second position;
    an engaging member, which engages with the mirror drive member to prevent the drive of the mirror drive member by the first biasing member;
    a first cam, which includes a charge portion for charging the second biasing member and a release portion for releasing the charge of the second biasing member; and
    a second cam, which releases the engagement of the engaging member with the mirror drive member,
    wherein the second cam causes the engaging member to retract from the mirror drive member when the mirror drive member and the engaging member are relatively moved toward a position at which their engagement is allowed.

2. The image-taking apparatus according to claim 1, further comprising a motor, which drives both of the first and second cams,
    wherein the motor drives the first and second cams only in one direction.

3. The image-taking apparatus according to claim 1, wherein the second biasing member charges the first biasing member when the mirror drive member is driven from the first position to the second position.

4. The image-taking apparatus according to claim 1, further comprising a shutter,
    wherein the first cam charges the shutter when the charge portion charges the second biasing member.

5. The image-taking apparatus according to claim 1, further comprising a shutter,
    wherein the second biasing member drives the shutter from a charged state to a state in which the release of the charge is allowed when the second biasing member drives the mirror from the first position to the second position.

6. An image-taking apparatus comprising:
    a mirror, which is movable with respect to an optical path;
    a mirror drive member, which is movable to a first position at which the mirror is disposed in the optical path and to a second position at which the mirror is disposed outside the optical path;
    a first biasing member, which produces biasing force for driving the mirror drive member from the second position to the first position;
    a shutter;
    a shutter drive member, which drives the shutter;
    an engaging member, which is provided for the shutter drive member and engages with the mirror drive member;

a second biasing member, which produces biasing force for driving the shutter drive member and drives the mirror drive member from the first position to the second position via the shutter drive member and the engaging member;

a first cam, which includes a charge portion for driving the shutter drive member in a direction in which the second biasing member is charged and a release portion for allowing the drive of the shutter drive member by the second biasing member; and a second cam, which releases the engagement of the engaging member with the mirror drive member that has been moved to the second position, wherein the second cam causes the engaging member to retract from the mirror drive member when the shutter drive member is driven by the charge portion to a position at which the engagement of the engaging member and the mirror drive member that has been moved to the first position is allowed.

7. The image-taking apparatus according to claim 6, further comprising a motor, which drives both of the first and second cams, wherein the motor drives the first and second cams only in one direction.

* * * * *